April 18, 1933.   S. MORTON ET AL   1,904,164
SIGNALING SYSTEM AND APPARATUS THEREFOR
Filed July 11, 1930   9 Sheets-Sheet 3

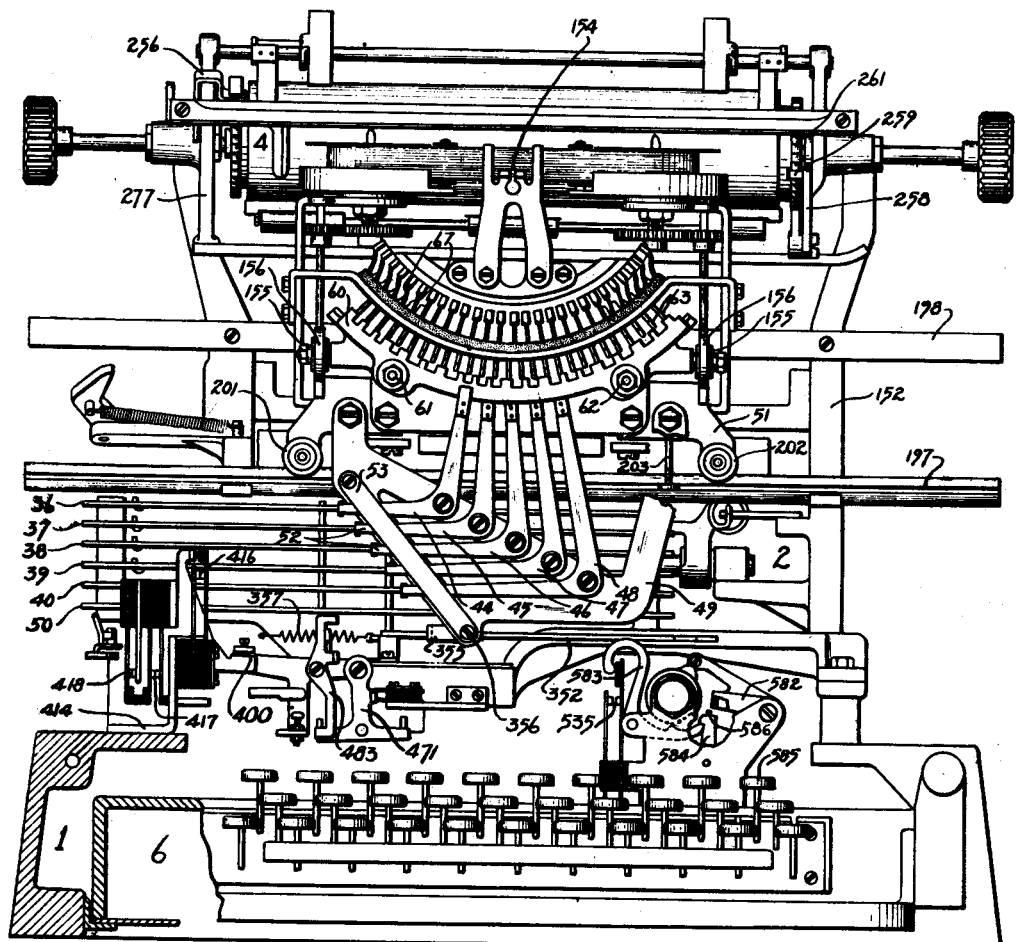
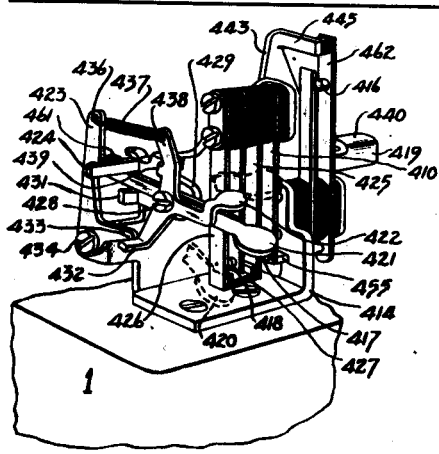

INVENTORS
STERLING MORTON
HOWARD L. KRUM
EDWARD E. KLEINSCHMIDT
BY
Strauch & Hoffman
ATTORNEYS

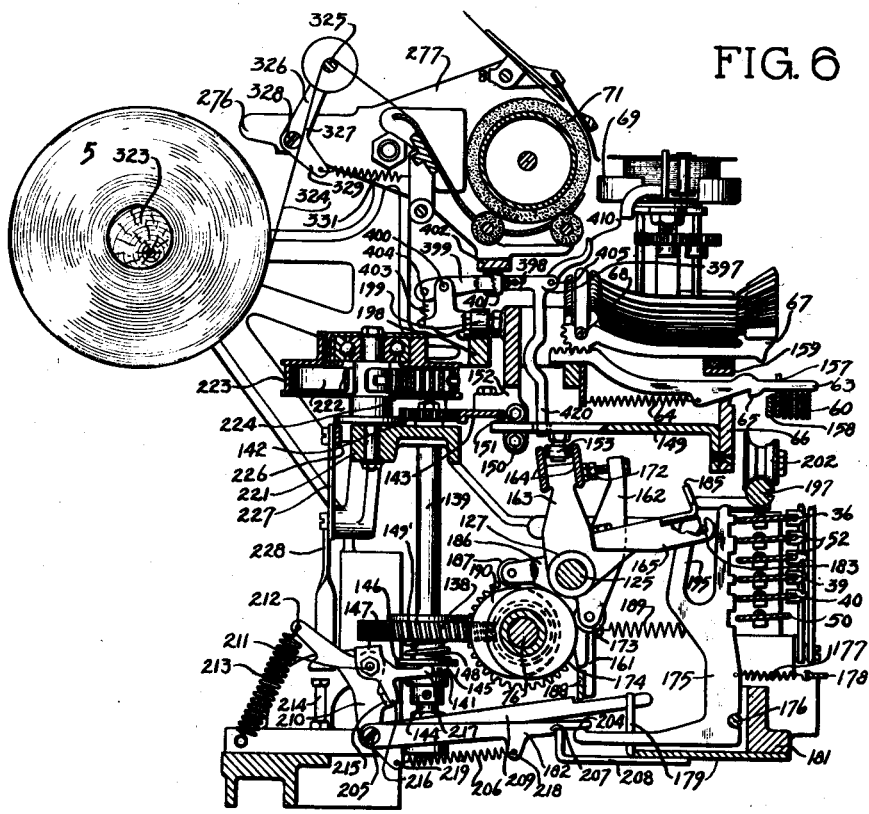
FIG. 6
FIG. 7
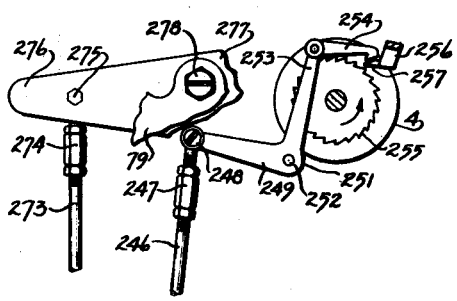
FIG. 8
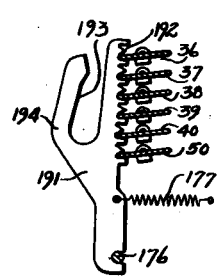
FIG. 9    FIG. 10
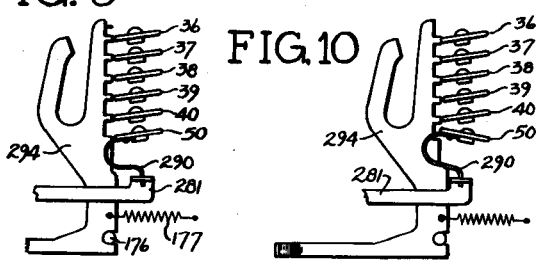
INVENTORS
STERLING MORTON
HOWARD L. KRUM,
EDWARD E. KLEINSCHMIDT
BY Strauch & Hoffman
ATTORNEYS April 18, 1933.    S. MORTON ET AL    1,904,164
SIGNALING SYSTEM AND APPARATUS THEREFOR
Filed July 11, 1930    9 Sheets-Sheet 5
FIG. 11
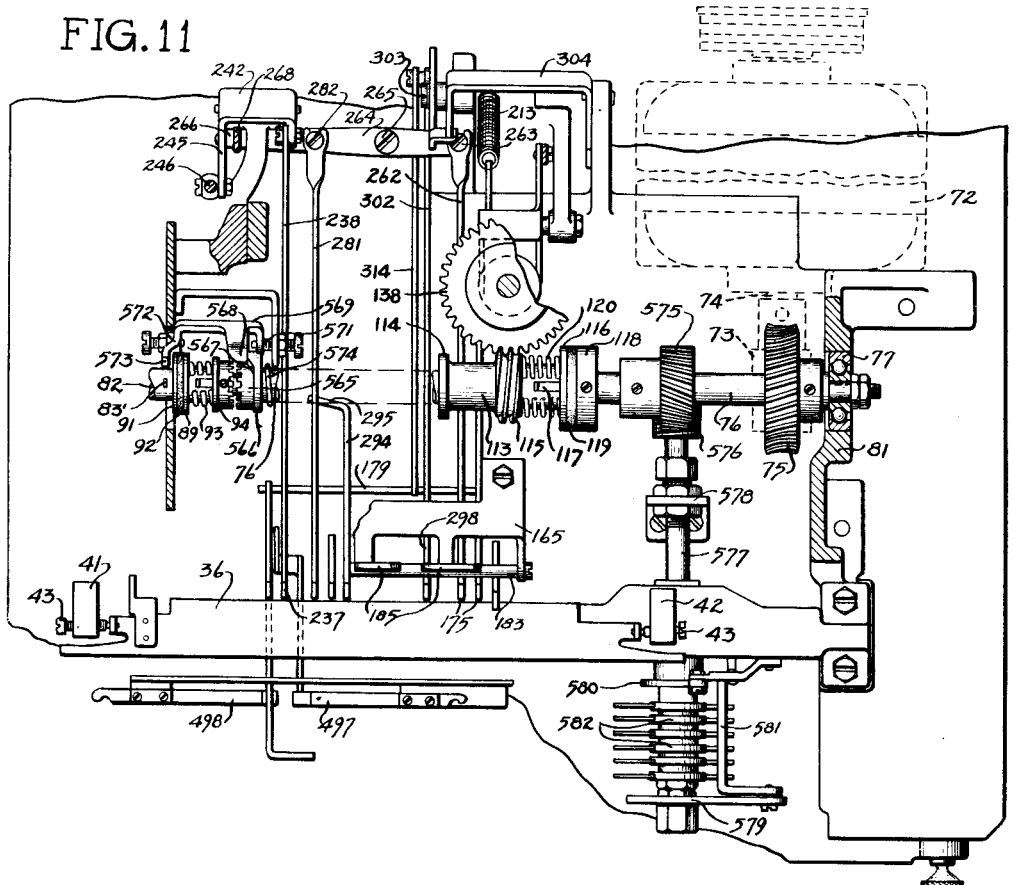
FIG 12
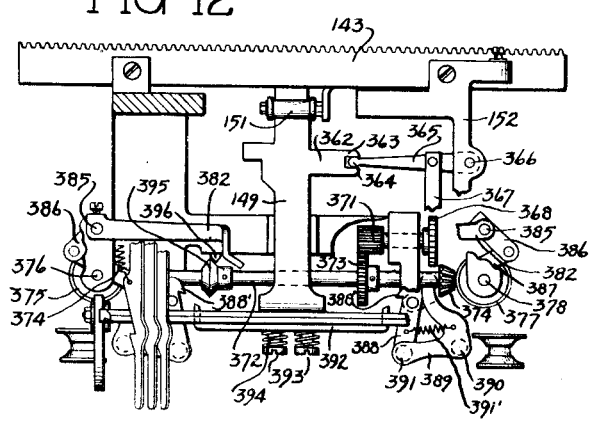
FIG. 13
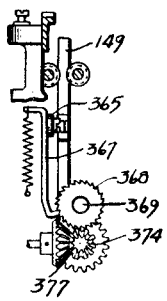
FIG. 14
INVENTORS
STERLING MORTON
HOWARD L. KRUM
EDWARD E. KLEINSCHMIDT
BY Strauch + Hoffman
ATTORNEYS

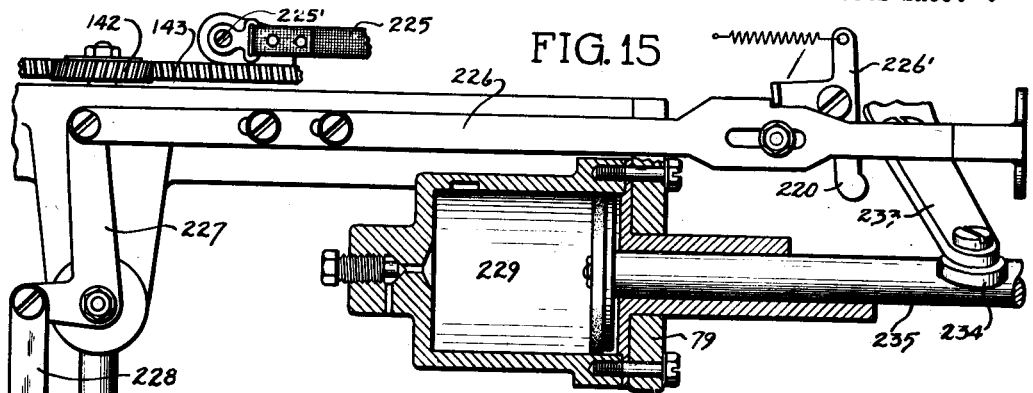
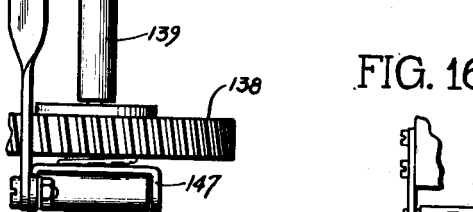
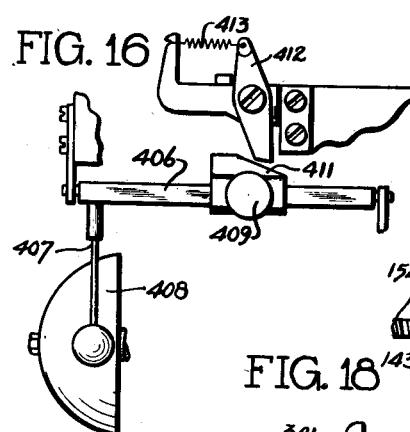
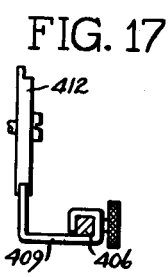
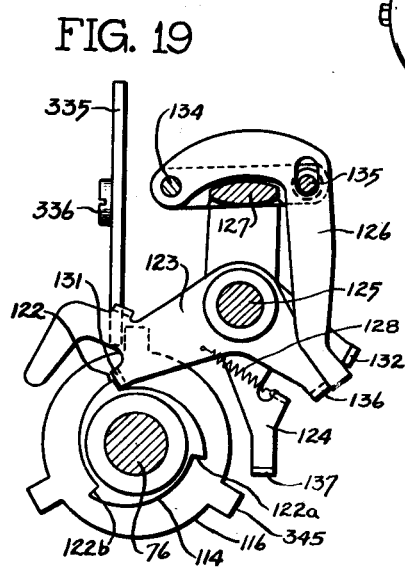
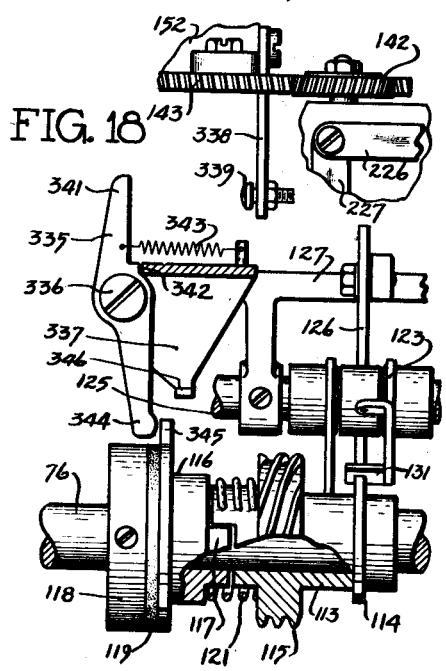

April 18, 1933.  S. MORTON ET AL  1,904,164
SIGNALING SYSTEM AND APPARATUS THEREFOR
Filed July 11, 1930  9 Sheets-Sheet 7
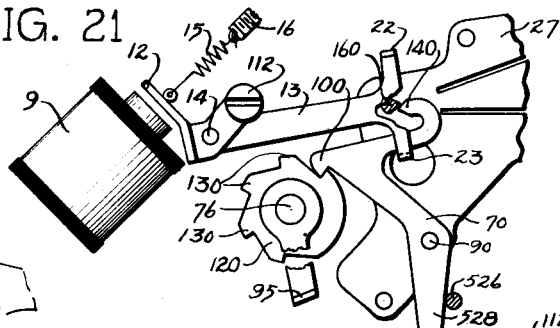
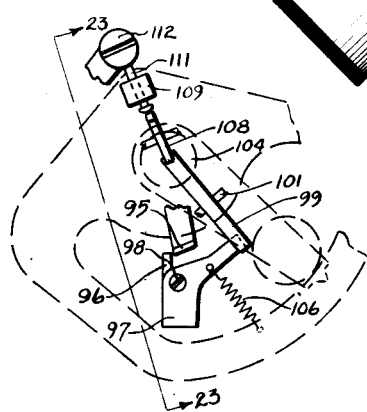
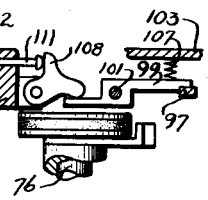
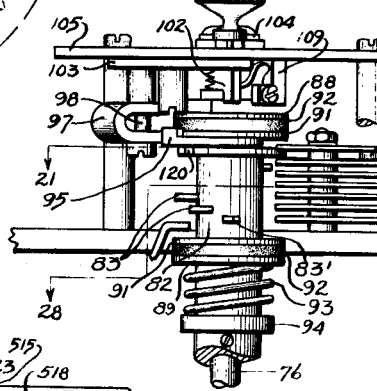
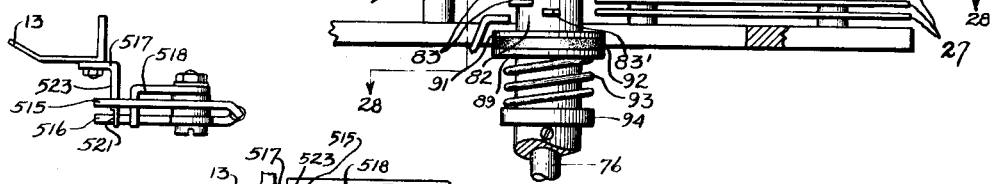
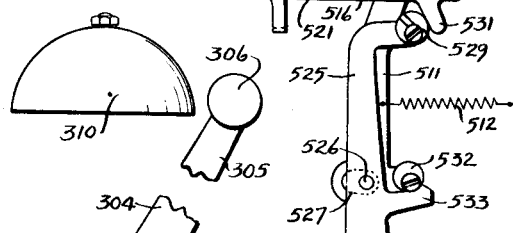
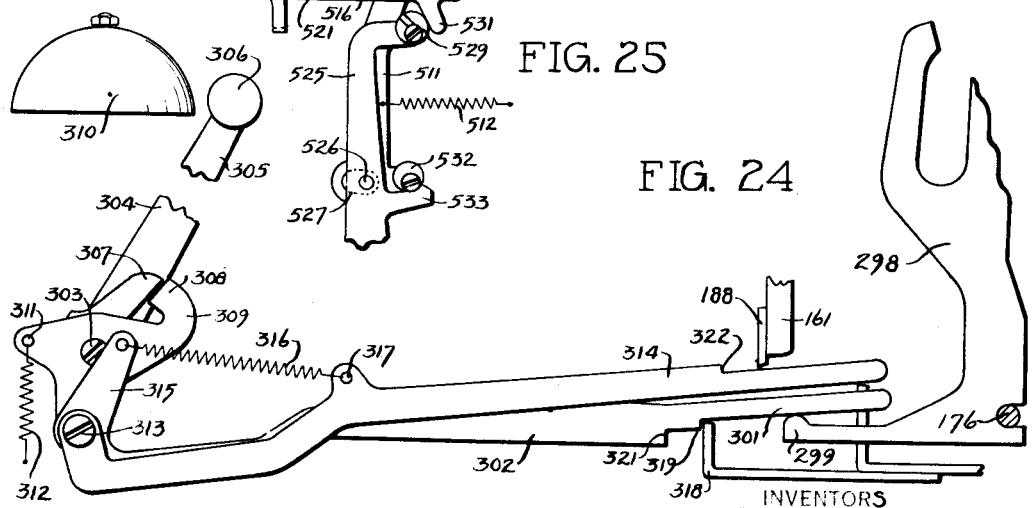
INVENTORS
STERLING MORTON
HOWARD L. KRUM
EDWARD E. KLEINSCHMIDT
BY Strauch + Hoffman
ATTORNEYS April 18, 1933.  S. MORTON ET AL  1,904,164
SIGNALING SYSTEM AND APPARATUS THEREFOR
Filed July 11, 1930  9 Sheets-Sheet 8

INVENTORS
STERLING MORTON
HOWARD L. KRUM
EDWARD E. KLEINSCHMIDT
BY Strauch & Hoffman
ATTORNEYS Patented Apr. 18, 1933

1,904,164

UNITED STATES PATENT OFFICE

STERLING MORTON, HOWARD L. KRUM, AND EDWARD E. KLEINSCHMIDT, OF CHICAGO, ILLINOIS, ASSIGNORS TO TELETYPE CORPORATION, OF CHICAGO, ILLINOIS, A CORPORATION OF DELAWARE

SIGNALING SYSTEM AND APPARATUS THEREFOR

Application filed July 11, 1930. Serial No. 467,352.

Our present invention relates to signaling systems and apparatus therefor, and more particularly to selective signaling systems and apparatus especially adapted for printing telegraph operation, but may be applied to a wide range of selective and remote control operations. Because of advantages in operation for certain classes of telegraphic communication printing telegraph receivers with stationary paper carriages and movable type baskets such for example, as disclosed in U. S. patents to Pfannenstiehl numbered 1,533,207; 1,540,710; 1,548,168 and 1,623,809 have been developed.

By our present invention we have provided novel selecting recording mechanisms of the general type disclosed in said patents, but of considerably improved construction and arrangement throughout, of decreased weight and of increased compactness and efficiency, permitting higher speed sustained operation. At the same time we have increased the number and range of selective operations that may be performed, materially lowered the costs of production and maintenance in operation, while increasing the reliability and durability of the apparatus.

An important feature of our invention is the provision for the accessibility of the individual sub-combinations of mechanisms performing the various related functions of the complete mechanism by arranging the sub-combination mechanisms in units that may be readily removed and replaced and interchangeably replaced, whereby complete replacement of individual units requiring major repairs and adjustments may be made rapidly and conveniently, without requiring replacement of the entire recorder or printer. At the same time many of the parts are designed for interchangeable use in other types of printing mechanisms and selective mechanisms for different classes of service so that such parts may be manufactured in large quantities for interchangeable use in various types of tape and page printers, and the manufacturing and maintenance costs of all such mechanisms using interchangeable parts are thereby minimized.

Accordingly a primary object of the present invention is to provide novel and improved selecting printing and remote control mechanisms of improved efficiency and durability, in which the costs of manufacture and maintenance are minimized.

Another object of our invention is the provision for the accessibility and replacement of the several parts of the apparatus by reason of its design as an assembly of inter-dependent units, each of which is completely removable and replaceable independently of the other related units, the parts being designed to be largely and interchangeably useful in other standard types of mechanisms.

Another object of the present invention is to provide an improved selecting mechanism under the control of a single electro-magnet adaptable to telegraphic printers wherein the platen is stationary and the type carriage is movable.

Further objects of our invention are to provide spacing mechanisms for a telegraph recorder embodying escapement elements of sturdy construction, which are more satisfactory and positive than the usual ratchet and pawl mechanisms; and to provide novel means for preventing the continued performance of the spacing and printing operations in a page printer after the movable carriage has reached the end of a predetermined length of line, thereby precluding the harmful consequences which now result in existing printers due to failure to transmit a carriage return signal at the end of a line.

Under modern conditions of communication the volume of business to be handled over existing channels of communication is increasing rapidly and economies of line time are becoming increasingly important. To effect maximum economy of line time, we have provided novel systems, methods and mechanisms for performing control operations to reduce the number of line signals necessary while increasing the operative selective range of the apparatus.

Another object of our invention therefore is to effect economy of line time as well as reduce to a minimum the possible erroneous transmission of messages by the provision of means whereby the spacing and platen unshifting operations can be combined without affecting the independent operation of either one of these functions in ordinary operation.

A further object of our invention is to provide a novel means whereby the range of operations of the apparatus is increased and by reason of which additional auxiliary operations or functions can be performed.

Considerable line time may also be lost in intercommunicating systems when it becomes necessary or desirable for a receiving operator to break in on the transmission and to communicate with the transmitting operator.

Accordingly a further object of our invention is the provision of a novel system of intercommunication, and novel means whereby the sending operator may be interrupted at the will of the receiving operator should the latter, for various reasons, desire to do so. For instance, should the receiving operator desire to have the sender repeat a message or a part thereof, he may by reason of the novel send-receive break mechanism, hereinafter disclosed, change the condition of the sender's apparatus from a sending to a receiving position and then proceed to transmit his request.

A still further object is to provide novel methods and apparatus for starting and stopping the motors by means controlled through the receiving selectors at each station. This feature of our invention involves the use of mechanical motor controlling means operable under the control of the selector mechanism, or under the combined control of the printer shift mechanism and the selector mechanism whereby the apparatus may be controlled from a distant station by the transmission of a special signal.

These and other objects which will be disclosed as the description hereof proceeds and which will be emphasized as they appear will be apparent from the following description and the appended claims when taken in connection with the accompanying drawings.

The preferred embodiment of our invention herein disclosed is illustrated in the following drawings in which—

Figure 1 is a front elevation of the herein disclosed apparatus.

Figure 2 is a perspective view of the break mechanism.

Figure 6 is a transverse cross-sectional view of the printer taken approximately through the vertical center line of Figure 1.

Figure 7 is a fragmentary end view of platen unit to show part of the line feed and platen shifting mechanisms.

Figure 8 is a cross-sectional view through selector vanes taken immediately to the left of the selector vane locking lever.

Figure 9 is a detail cross-section through the selector vanes to show the "sixth" vane in the unshift or letters position.

Figure 10 is a view similar to Figure 9 showing the "sixth" vane in the shift or figures position.

Figure 11 is a sectional plan view of the printing unit.

Figure 12 is a fragmentary top view showing the ribbon feed mechanism.

Figure 13 is an end view of Figure 12.

Figure 14 is an elevational view of the ribbon reverse arm.

Figure 15 is a partial rear elevation of the printer to show the manual carriage return mechanism.

Figure 16 is a detail view of the margin signal bell mechanism.

Figure 17 is an end view of Figure 16.

Figure 18 is a detail rear elevation showing a printing cut-out mechanism of the printer as well as the spacing mechanism.

Figure 19 is a side view of Figure 18 showing the spacing mechanism.

Figure 20 shows an elevation of essential parts of the mechanical selector and start-stop distributor of telegraphic signals which forms a part of the mechanism of Figure 4, approximately on the line 20—20 of Figure 4.

Figure 21 is a horizontal section on the line 21—21 of Figure 20 and shows a plan view of the armature lever locking device.

Figure 22 shows details of the orientation mechanism and starting mechanism of the selector of Figure 20.

Figure 23 is a section on the line 23—23 of Figure 22 and shows the starting members of the selector of Figure 20.

Figure 24 is a fragmental view showing the mechanism associated with the automatic signaling device.

Figure 25 is a detail view of the latching mechanism pertaining to the motor stop function.

Figure 26 is a top view of mechanism shown in Figure 25.

Figure 3:
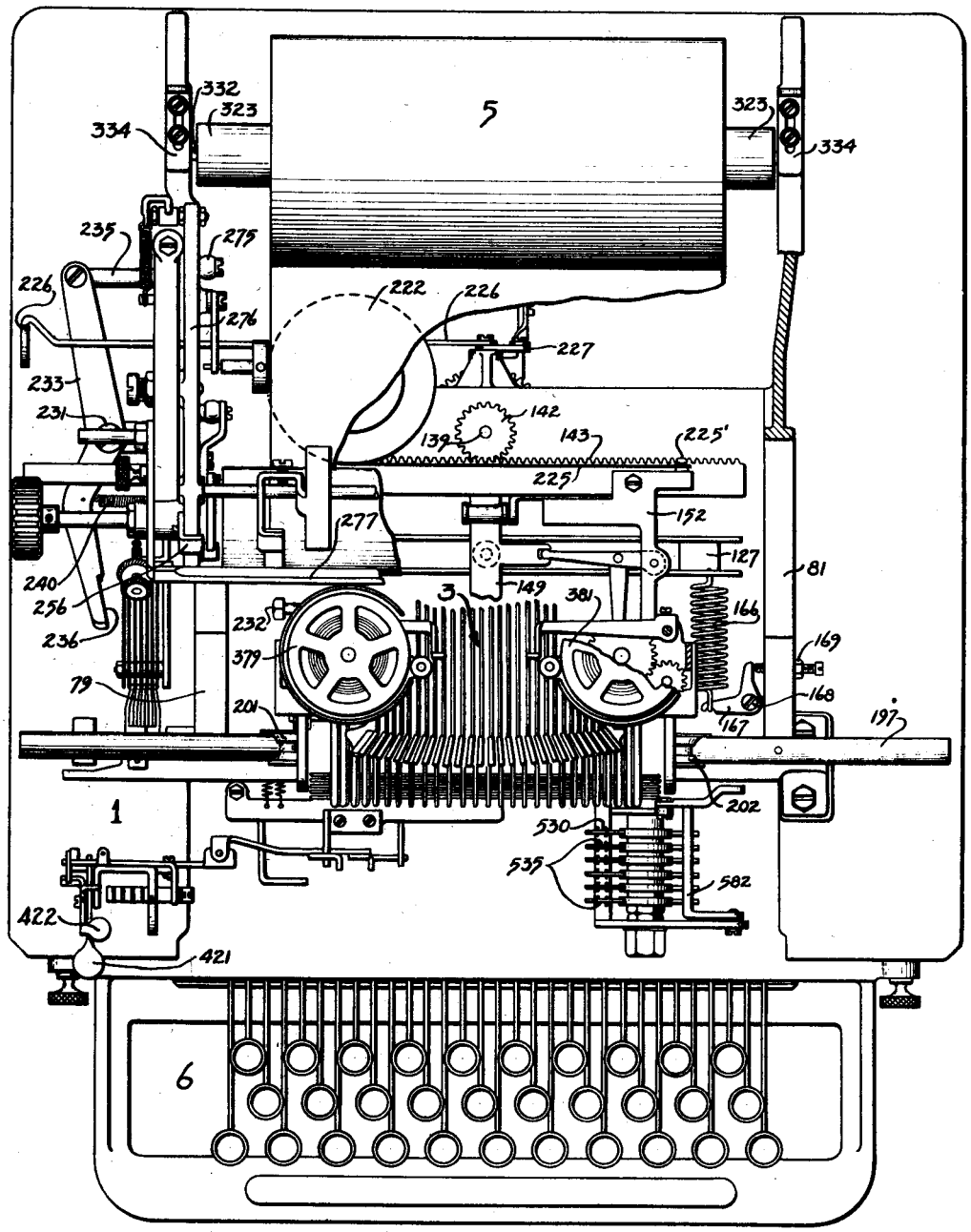
Figure 3 is a plan view of the printing apparatus.

In general, as clearly shown in Figures 1 and 3, sheets 1 and 2, our apparatus comprises base unit 1, printing unit 2, type-bar carriage unit 3, platen unit 4, paper roll unit 5, keyboard unit 6 and vane frame unit 7, which construction as an aggregate of variant units enhances the accessibility of the several parts of the apparatus considerably, and simplifies the maintenance thereof. The keyboard unit 6 is fully described in U. S. Patent No. 1,595,472 issued August 10, 1926 to H. L. Krum, and is removably attachable to the herein described apparatus.

The apparatus herein disclosed is operated by various code combinations of impulse conditions and is mechanically and selectively controlled thereby. These impulse conditions are translated into mechanical operations and functions by means of selector mechanism 8, through a single selector magnet 9, in the following manner.

*Selecting and printing*

Figure 4:
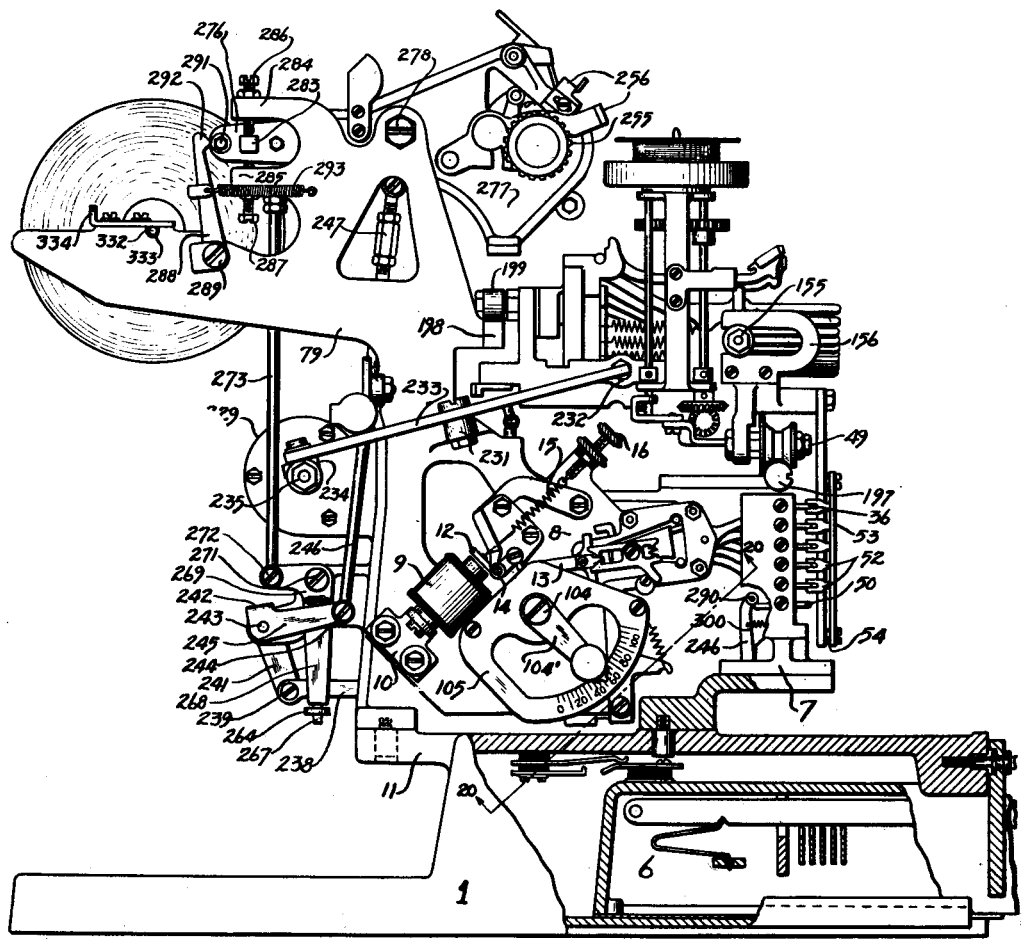
Figure 4 is a left side elevation of the printer, with the base and keyboard units shown partly in section.

Referring to Figure 4, Sheet 3, selector magnet 9 is secured to bracket 10 which in turn is fixed to side-frame 11, of printing unit 2, as seen more clearly in Figure 21, Sheet 7. The magnet 9 has an armature 12 which is fixed to a lever 13. Lever 13 is substantially U-shaped and its end adjacent to the armature is supported upon the pivot stud 14. A spring 15 has one of its ends secured to armature 12 and its other end secured to an adjusting screw 16. Normally the magnet 9 is energized and holds the armature despite the tension of its spring 15.

Referring to Figure 21, Sheet 7, and Figure 28, Sheet 8, the free end of the lever 13 is T-shaped and is provided with a pair of laterally extending arms or abutments 22 and 23, which cooperate with laterally projecting arms 24 and 25 on the rear ends of selector fingers 26 to position the latter either in their right or left hand positions as will be described hereinafter.

Figure 28:
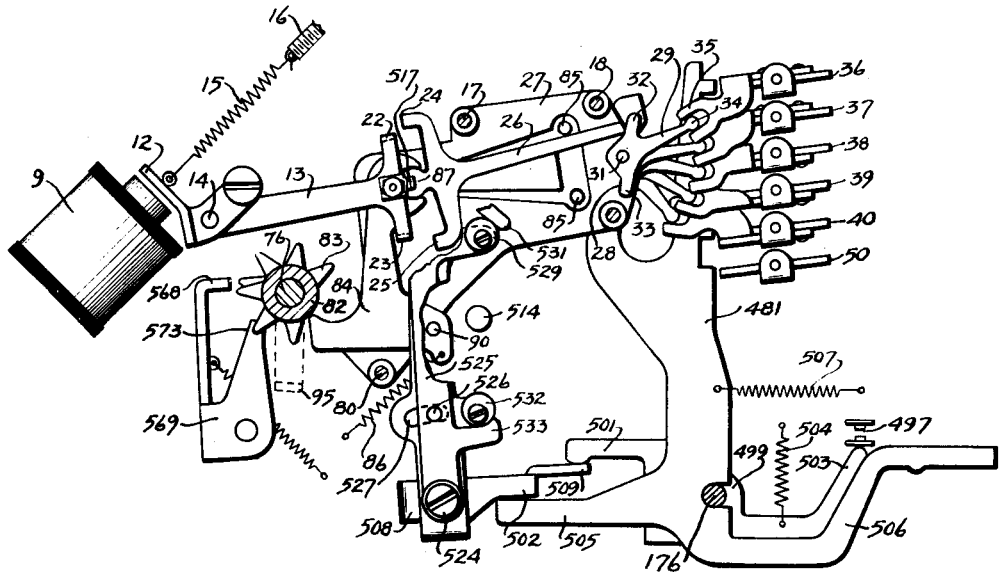
Figure 28 is a horizontal section taken approximately on line 28—28 of Figure 20 and shows in addition thereto the relation of the mechanical selector to the motor stop mechanism.

The selector fingers 26, of which there are five, are thin flat members separated by thin flat guide plates 27, see Figure 28, Sheet 8, which serve to keep selector fingers 26 in alignment. The guide plates 27 are mounted on studs 17 and are spaced by washers 18 and the studs are fixed to frame 11. The selector fingers 26 are adapted to go through two different movements, first a reciprocating movement and then a rocking movement. The manner in which these movements are produced and their consequent effects will be described hereinafter. Each selector finger 26 has a knife edge 28 which engages with its respective rockable T-shaped lever 29. The T-levers 29 are arranged between the guide plates 27 and are pivotally mounted on a stud 31 and each comprises three arms 32, 33 and 34. The arms 34 of each T-lever are rounded, as shown, and engage bifurcated members 35 fixed to selector vanes 36, 37, 38, 39 and 40. The selector fingers 26 act through T-levers 29 to position the selector vanes 36 to 40 inclusive as will hereinafter appear.

The selector vanes 36, 37, 38, 39, 40 and 50 (Figures 1, 6 and 27, Sheets 1, 4 and 8) are of a construction substantially as shown, and as indicated in the present embodiment, are preferably located on the front side of the apparatus. These vanes extend almost entirely across the printer and are adapted to be rotated both clockwise and counterclockwise for selection purposes, but are not arranged to move endwise. These vanes are adapted to independently control the setting of a series of permutation code bars for character printing, and the selection of a series of function levers for the various functional operations. The printing operations and the function or auxiliary operations are performed independently of each other, said operations being controlled by a cam individual thereto. These vanes are rotatably mounted at their ends to supports 41 and 42 (Figure 11, Sheet 5) of vane frame unit 7 substantially as shown by means of mounting screws 43. Cooperating with the vanes 36 to 40 are bell crank levers 44, 45, 46, 47 and 48 (Figure 1) pivotally connected to bell crank mounting plate 49 which is appropriately located relative to and secured to type bar carriage frame 51. As seen from Figure 4, Sheet 3, ends 52 of bell crank levers 44 to 48 inclusive are bifurcated and are laterally disposed and have operable engagement with said vanes. The ends 52 of bell cranks 44 to 48 are slidably engaged with the vanes 36 to 40, since these bell cranks reciprocate across the machine whereas the vanes do not reciprocate. Adjacent ends 52 of said bell crank levers is retaining bar 53 (Figures 1 and 4) mounted in spaced relation on bell crank mounting plate 49 by reason of spacing washers 54. The opposite ends of bell crank levers 44 to 48 inclusive are suitably connected to code bars 56, 57, 58, 59 and 60, which, in turn, are suitably guided on studs 61 and 62 for restricted movement both clockwise and counterclockwise, slotted holes being provided in said code bars.

The code bars, as is well known, are adapted to be set in different combinations in accordance with different code signals and are so notched on their upper edges that in any setting or alignment of notches one of the pull-bars 63 (Figure 6, Sheet 4) can fall into the notches thereof under the influence of springs 64 associated with each pull-bar. The falling or dropping of a pull bar into the aligned notches moves hook 65 of pullbar into the path of pull-bar bail or striker bar 66, which when operated in a manner to be hereinafter described will engage hook 65 and urge pull-bar outwardly against the action of spring 64 thereby causing the selected type bar 67 to rotate about curved or common fulcrum 68 by reason of the rack and pinion engagement between pull bars 63 and type bars 67. Of course, as is well known, this rotation of type bar 67 is incident to the printing of a character on a sheet of paper interposed between inking ribbon 69 and platen 71 as on an ordinary typewriter.

Power for operating the selecting mechanism is supplied by a motor 72 (partly shown in Figure 11, Sheet 5) through pinion 73 mounted on motor shaft 74 and gear 75 keyed to main shaft 76 of printer. The shaft 76 is journaled in anti-friction bearings 77 supported in side frames 79 and 81. Mounted upon the shaft near one end thereof is a cam barrel 82 (Figure 20, Sheet 7) which is frictionally connected to main shaft 76 by means of suitable clutch members.

The cam barrel 82 (Figures 20 and 25, 28, Sheets 7 and 8) has a spirally arranged series of cams 83, one for each of the five bell cranks 84 and which rotate the bell cranks 84 in succession about their common pivot 80 and thus reciprocate longitudinally the succession of selector fingers 26 as the cam barrel is rotated. It will be noted that the circular ends 87 of selector fingers 26 engage corresponding sockets in bell cranks 84. In addition to this longitudinal movement the selector fingers 26 have a lateral swinging movement between the pair of studs 85. The springs 86 associated with bell crank levers 84 normally hold the selector fingers 26 in their forward position and in engagement with the T-levers 29 and each selector vane 36 to 40, inclusive, thus is held in either one or the other of its two positions, according to the position of the selector finger 26.

The abutments 22 and 23 on the armature lever 13 are positioned to the rear of the arms 24 and 25 of the selector fingers 26 but are spaced more closely together than the ends of the arms 24 and 25 so that as the armature lever 13 vibrates in response to the received electrical conditions the abutments 22 and 23 alternately move into and out of alinement with the ends of arms 24 and 25. Abutments 22 and 23 will cooperate with their associated arms 24 and 25, as the selector fingers 26 are reciprocated by the associated bell crank and the rotary cam barrel to determine the setting of the selector fingers each in its right hand or left hand position.

As each signal pulse is received upon the line magnet 9 the magnet responds to one of the two different electrical conditions and selectively holds its armature lever 13 while one of the fingers 26 is reciprocated by a cam 83 of the spiral series on the cam barrel 82. The arms 24 and 25 are brought into cooperative relation with the abutments 22 and 23 at the corresponding signal intervals thereby setting the selector fingers in variant combination.

As seen in Figure 20, Sheet 7, the cam barrel 70 is driven from the shaft 76 through the medium of a friction clutch comprising two pairs of discs each pair having a washer of friction material between the discs. The disc 88 is attached rigidly to the shaft 76. The disc 89 is splined to the shaft 76. The discs 91 are attached rigidly to the cam barrel 82 which is sleeved loosely upon the shaft 76. Friction washers 92 are interposed between the discs. The frictional relation between cam barrel 82, discs, 88, 89, and 91, and friction washer 92 is adjusted by means of helical spring 93 and adjustable set collar 94.

Referring to Figures 21, 22 and 23, Sheet 7, the stop arm 95 rigidly attached to the cam barrel 82 is provided with an upturned end which normally engages the lug 96 on the lower arm of the U-shaped stop gate 97. The gate 97 is mounted upon the pivot stud 98 and its upper arm is adapted to be engaged by the latch 99. The latch 99 is pivoted at 101 to a journal block 102. This journal block and the pivot stud 98 are mounted upon the adjusting plate 103. The adjusting plate is rotatable about the pivot stud 104 and is clamped to the plate 105 which is fixed rigidly to the frame of the selector, arm 104' (see Fig. 4, Sheet 3) cooperating with a scale to indicate the various adjusted positions of plate 103.

The spring 106 extending from the gate 97 to the frame of the selector tends to rotate the gate clockwise, as viewed in the Figure 22. The stop arm 95 tends to rotate the gate in reverse direction. The latch 99 restrains the gate 97 against push of the stop arm 95.

The pivot stud 104 and the inner end of the latch 99 are in line with the axis of the shaft 76. The spring 107 is compressed between the latch 99 and the adjusting plate 103 and normally holds the outer end of the latch depressed and in position to engage the upper end of the gate 97. A trip member in the form of a small bell crank 108 is pivotally mounted in the block 109 upon the fixed plate 105 and its inner end may engage the inner end of the latch 99 at a point in line with the axis of shaft 76 and with the axis of the pivot stud 104.

The plunger 111 extending through the block 109 is adapted to engage the bell crank 108 and is adapted to be engaged by the head of the screw 112 mounted on the upper arm of the armature lever 13. The operation is as follows:

During the first line-pulse or start interval, which is of spacing nature, the magnet 9 is de-energized and the movement of the armature lever which will be effected by the spring 15 will cause the screw head 112 to shift the plunger 111 and thus rock the bell crank 108. The inner end of the bell crank engages the inner end of the latch 99 and rocks the latch about its pivot 101 so that the latch disengages itself from the gate 97. The gate 97 then is rotated in a counterclockwise direction by the pressure of the arm 95 against it. The cycle of operation of the cam barrel is thus initiated. Prior to the reception of the first line-pulse or start interval rotation of cam barrel by shaft 76 is prevented by engagement of arm 95 with latch 97, the clutch members 89 and 91 slipping. When latch 97 is released by a start interval the cam barrel 82 is released for rotation with shaft 76. As soon as the stop arm 95 passes the end 96 of the gate 97, the gate 97 will be rotated clockwise by its spring 106. During the signal code, the latch 99 will be vibrated without effect by the several signal pulses as received from the code combination, but the stop pulse of marking nature which always terminates the cycle will withdraw the screw head 112 from the plunger 111 and will permit the spring 107 to operate the latch 99 and the bell crank 108, the latch 99 being thus left free to take its normal position to engage the upper arm of the gate 97. The stop arm 95 then will engage the end 96 of the gate and will rotate the gate against its spring 106 until the gate engages the latch 99 which will stop both the gate 97 and the stop arm 95 thus stopping the cam barrel 82 to which the stop arm 95 is attached. The parts are so arranged that the cam barrel 82 is stopped positively by the gate 97 at the end of each cycle and is readily released by the starting movement of the armature lever 13, also the tripping arrangement permits the orientation adjustment of the gate 97 so that the engagement of the first cam 83 and its cooperating bell crank 84 will occur during the most favorable portion of the first pulse of the received selective code.

The cycle thus is started with proper orientation. Should the first signal condition be a marking pulse condition, the magnet 9 will be in energized condition at the time that the first cam 88 operates the bell crank 84 which operates the first finger 26, which thus is adjusted to its marking position. Had the first pulse after starting been of spacing nature, the armature 12 would remain in its spacing position after the spacing start pulse. The first cam 83 would then operate the first bell crank 84 which would operate the first finger 26 which thus would be adjusted to its spacing position. The remaining pulses are served similarly.

To provide a wide margin of operation, the setting of the primary selectors or fingers 26 should be selected or determined at definite points or very brief intervals uniformly spaced throughout the selecting cycle, so that such points may register with the mid portions of the intervals of the received signals or code combinations. It is difficult, however, to so construct the parts of a mechanical selector so as to effect such an operation and particularly where, as is highly desirable in order to permit rapid operation, the parts are of light weight and the vibratory movement of the armature lever slight. To provide for a wide margin, means is employed for intermittently locking the vibrating armature lever 13 in one or the other of its selecting positions, such locking occurring at definitely spaced points in the selecting cycle and which points are slightly in advance of the time intervals or portions of the cycle during which the setting of the selectors or fingers 26 is effected.

In the preferred form, the locking device comprises an arm or lever 70, Figure 21, Sheet 7, pivoted on a stud 90 and arranged between the two uppermost guide plates 27. The arm or lever 70 is provided with a nose or shoulder 100 and a spring 110 connected to the arm holds the nose 100 in engagement with the periphery of a cam 120 that forms part of and rotates with the cam member 82. This cam is provided with a series of teeth or shoulders 130, five in number, which successively vibrate the arm during each operating cycle. The end of the arm 70 is also provided with a beveled locking dog or knife-edge 140 which cooperates with a knife edge 160 fixed to the under side of the armature lever 13 adjacent its outer end. When the nose 100 of the locking arm 70 is on the high portions of the cam 120, the knife edge 140 is slightly out of the path of movement of the cooperating knife edge 160 of the vibrating armature lever, but when the nose passes over the radial shoulders of the teeth 130, the knife edge 140 will engage knife-edge 160 and hold the armature lever either in its right-hand or left-hand position.

The number of teeth 130 corresponds to the number of selecting intervals of each signal and they are so spaced that the locking device is quickly shifted into engagement with the armature by the spring 110 at definite points in each revolution or setting cycle of the cam member 82, and which points are so arranged that the armature lever is locked in one or the other of its positions just before any engagement of the arms 24 and 25 with the abutments 22 and 23 occurs, so that the setting of the respective selectors is definitely determined at such points or brief intervals. Furthermore, the teeth 130 are so arranged that the armature lever is held against vibration while the arms 24 and 25 of the selecting fingers are in engagement with the abutments 22 and 23, and in this way the armature lever is securely held against vibration during any of the changes in the setting of the selectors. It will be observed that in addition to the five positions on cam 120 above mentioned there is provided a longer dwell or high portion so adapted as to hold knife edge 140 out of engagement with knife edge 160 when said cam 120 is in the stop position. The reason for this will become apparent hereinafter under the consideration of the motor-control mechanism.

The operation of printing bail 127 (Figure 6, Sheet 4) will now be described. It has been seen how a selection of a character is made beginning with the selector magnet 9 through transfer T-lever 26, selector vanes 36 to 40, bell crank levers 44 to 48, code bars 56 to 60 and pull-bars 63. Referring to Figure 6, it will be noted that pull-bar-operating-bail 66 is provided with plunger member 149 (also shown in Figure 3), one end of which is secured to bail member 66 and the other or free end is interposed between guide rollers 150 and 151 appropriately mounted at rear of type carriage frame 152. Suitably secured to plunger member 149 and depending therefrom is guide roller 153 adapted for rolling engagement in a longitudinal direction with printing bail 127, substantially as shown. It will be observed from Figure 1 that the type bars 67 and pull-bars 63, are arranged in a circular manner about printing point 154 so that the travel of each individual type bar is identical. The purpose, therefore, of curved code bars is obvious. Likewise, all the parts directly associated with the type bars 67 and pull-bars 63 are similarly curved. Pull-bar bail member 66 is provided on its ends with flanged rollers 155 (Figure 4, Sheet 3) adapted to be movably mounted in suitable brackets 156, substantially as shown. It is apparent, then, that the pull-bar operating bail including its plunger 149 is mounted for reciprocative movement at three points; namely, brackets 156 (one on each side of type carriage) and between guide rollers 151 and 152.

Adjacent to curved code bars 56 to 60 and to the left thereof as viewed in Figure 6 is the pull-bar comb 157 which serves as a guide for the free end of the pull bars and which is provided with a series of open ended slots, one for each pull-bar. Also adjacent to comb 157 and oppositely disposed thereto with relation to code bars 56 to 60 is the adjustable trip off bail or stripper 158, the purpose of which will hereinafter appear. Incidentally comb 157 and stripper 158 are fixed to type carriage frame 152. Adjacent the free ends of type bars 67 and on the underneath side thereof is located the type bar back stop 159 suitably fixed to type carriage frame 152 and comprising a shock absorbing material, such as leather, mounted on a metal strap or bar.

Rotatably mounted on bail shaft 125 (Figure 6, Sheet 4) is the printing bail 127, function bail 161 and printing bail return lever 162. Bail shaft 125 is suitably journaled in the side frames 79 and 81. Printing bail 127 comprises a frame work 163 on which are mounted blades 164 suitably spaced to serve as a guideway for roller 153. To this frame-work 163 is also mounted function lever bail 165 hereinafter described. At one end of the printing bail 127 is secured one end of printing bail or striker spring 166 (Figure 3, Sheet 2) the other end of which is secured to one arm of spring adjusting lever 167 pivotally mounted at 168 on side frame 81. The other arm of lever 167 cooperates with adjusting screw 169. This arrangement obviously affords means for adjusting the tension of striker spring 166. Near the other end of printing bail 127 is the printing bail return lever 162 (Figure 6, Sheet 4). Mounted at the end of one arm of lever 162 is the adjustable striker 172 which has cooperative relationship with printing bail arm 163, as hereinafter set forth. Mounted on the other end of lever 162 is follower roller 173 which cooperates with eccentric printing cam 174.

Oscillatory motion is imparted to printing bail 127 in the following manner. Normally, follower roller 173 rides on the high part of the eccentric cam 174 and in consequence thereof printing bail 127 is held to the left (as viewed in Fig. 6) by striker 172 on lever 162. Printing bail 127 is always under the influence of striker spring 166 (Fig. 3) which tends at all times to rotate said bail 127 in a clockwise direction. Therefore, as the printing cam 174 revolves it releases lever 162, thereby allowing striker spring 166 to pull printing bail 127 in said clockwise direction, at the same time imparting motion of the same direction to lever 162, through striker 172 thereby holding follower roller 173 in contact with periphery of cam 174. This rotative movement is terminated when follower 173 engages the low part of eccentric cam 174. It is obvious then that cam 174 and spring 166 cooperate to impart an oscillatory movement to printing bail 127.

One feature in this method of operating the printing bail 127 is the prevention of jamming which might result if bail were operated by positive mechanical movements. By our invention we provide for the spring operation of the printing function thereby eliminating every possibility of jamming. Another feature in this spring method of operation will become apparent in the disclosure of the auxiliary functions.

It is obvious that this oscillatory motion of the printing bail 127 imparts a reciprocative motion to pull-bar bail 66 through pull-bar bail plunger 149, and guide roller 153.

Still referring to Figure 6 and assuming that a character selection has been set up in the manner hereinbefore described, and that the code bars have been thereby arranged so that there is an alinement of notches corresponding to the selected character, the pull bar 63 individual thereto will be pulled into the alined notches by its spring 64. The pull-bar bail in its movement to the right will engage the hook 65 of the selected pull-bar 63 and urge it also to the right. Now, after the selected pull-bar has been so actuated for a predetermined distance the back end of the hook 65 of the pull-bar strikes the adjustable tr.p-off bail or stripper 158 and the pull-bar is thereby released from the operating bail 66 so that it may return to its normal unoperated position independently. As hereinbefore mentioned, this movement of the pull-bar causes the rotation of its individual type bar 67 about common fulcrum 68 through the rack and pinion engagement between pull bars and type bars.

The force of the blows of the type bars against the platen is adjustable in the following manner, which is an important feature of our invention. It was noted that the trip-off bail 158 caused the selected pull-bar to be ejected from or pushed out of engagement with pull-bar bail or striker bar 66 at a predetermined point or instant thus allowing the selected pull-bar to return to its normal position independently.

Now, since the amount of rotation of the selected type bar 67 about point 68 is governed by the horizontal movement of the selected pull-bar 63 through the rack and pinion engagement thereof, it is apparent that the duration of engagement of bail 66 and pull bar 63 affects the amount of rotation of the type bar. That is, selected type bar 67 may be rotated through 90° by simply postponing the time of ejectment of pull-bar 63 from bail 66, or conversely, by advancing the time of said ejectment the amount of rotation of the selected type-bar can be reduced correspondingly. It will thus be seen that in the latter case selected type-bar and pull-bar taken together will have escaped the influence of the pull-bar bail 66 before the platen has been reached by the type bar. Therefore, since a sudden and substantial force is imparted to pull bar bail 66 by striker spring 166 through printing bail 127 and plunger 149 it is readily seen that the momentum stored up in the rotating type bar by reason of the impetus of the force imparted to it by the pull bar bail 66 will carry the type-bar against the platen with sufficient force to effect the printing of a character, overcoming also the tension of individual spring 64. However, since it is sometimes desirable to print several copies, the effective stroke of the type-bar will of necessity have to be varied correspondingly. This is accomplished by adjusting the position of the trip off bail 158 to advance or retard the time of ejectment or "tripping off" of the pull bar.

Spacing

The manner of spacing between characters will now be described, reference being had to Figures 11 and 18, Sheets 5 and 6. Mounted on the main shaft 76 and located centrally of the apparatus is the sleeve member 113. Sleeve member 113 comprises escapement ratchet 114 and escapement worm 115 which are operably connected thereto. Sleeve member 113 is operably connected to hub of disk 116 by means of interengaging tooth members or splines 117. Collar 118 is pinned to main shaft 76 and is rotatable therewith. Interposed between disk 116 and collar 118 is disk 119 of frictional material, for instance, felt. By means of helical spring 120 sleeve 113 is frictionally connected to friction clutch comprising members 116, 118 and 119. Sleeve 113 is thereby rotatable with main shaft 76 unless arrested as will hereinafter appear.

Referring to Figure 19, Sheet 6, it will be noted that in the present embodiment of the present invention ratchet 114 is provided with three teeth or notches 122, 122a and 122b, the escapement of which, as will presently appear, will allow the type carriage to be moved forward one step or character space. In this figure, the escapement mechanism comprises levers 123 and 124, pivotally mounted on bail shaft 125, and lever 126 adjustably fixed to printing bail 127. Spring 128 normally tends to rotate levers 123 and 124 in opposite directions, since it is common to both levers. Lever 123 is normally urged by spring 128 in a counterclockwise direction so that laterally disposed end 131 engages tooth 122 of ratchet 114 thus arresting the rotation of said ratchet. Lever 124 is normally held out of engagement with ratchet 114, against the tension of spring 128, by the action of lever 126 against laterally disposed end 132.

Lever 126 is pivotally connected to printing bail 127 at 134 and is provided at 135 with a slot and screw adjusting means, whereby the correct relative position of escapement levers 123 and 124 with respect to ratchet 114 may be determined. The spacing operation occurs immediately following the printing of a character in the following manner.

Upon the printing of a character, lever 126 is caused to rotate slightly in a clockwise direction with printing bail 127 which moves clockwise about bail shaft 125, thereby transferring this motion to lever 123 through its laterally disposed end 136 and tripping its end 131 out of engagement with tooth 122 and permitting ratchet 114 to rotate slightly in a clockwise direction under the influence of friction clutch members 116 to 119 hereinbefore mentioned until arrested by the engagement of tooth 122a with laterally disposed end 137 of lever 124 which lever was free to rotate in a clockwise sense under the tension of spring 128 into the path of the on-coming tooth 122a. Ratchet 114 is thus restrained from rotation by lever 124 until the completion of the printing of a character at which time printing bail 127 and associated lever 126 are caused to rotate in the opposite direction. Restraint of lever 123 by lever 126 through end 136 is thereby released, permitting lever 123 to rotate in a counterclockwise direction under the influence of spring 128 into the path of tooth 122b of ratchet 114. During this counterclockwise movement of lever 126 and immediately after the aforementioned release of lever 123, lever 124 is caused to rotate in a like direction due to the action of lever 126 on end 132 thereof, thereby disengaging end 137 of lever 124 from tooth 122a and allowing ratchet 114 to continue its rotation until arrested by the engagement of end 131 of lever 123 with tooth 122b.

From Figures 18 and 19, Sheet 6, it is obvious, that since worm 115 and ratchet 114 are integrally connected to sleeve 113 said worm 115 will have the same intermittent motion as was hereinbefore seen to be imparted to ratchet 114. Worm 115 is meshed with worm gear 138 (Figures 6 and 11, Sheets 4 and 5) which is loosely mounted on vertical shaft 139, and operably connected thereto by means of jaw clutch 141. Worm 115 and gear 138 are in the present embodiment so related that one-third revolution of worm 115 will rotate gear 138 through a distance equal to the unit circular pitch, which, as will hereinafter appear, causes the type carriage to be stepped forward one space.

Shaft 139 (Fig. 6, Sheet 4) is vertically mounted in the printing unit and suitably journaled in anti-friction bearings, not shown. Fixed to the upper end of shaft 139 and rotatable therewith is the pinion gear 142 (Figs. 3 and 6) which meshes with rack 143 of the type carriage, see Figure 12, Sheet 5, and Figure 18, Sheet 6. Near the lower end of vertical shaft 139 and pinned thereto for rotation therewith is the driving member 144 of jaw clutch 141 (Fig. 6). Cooperating with driving member 144 and slidably mounted on shaft 139 is the driven member 145 of jaw clutch 141. Member 145 is provided with integral disk or annulus 146 which cooperates with clutch release lever 147, as will hereinafter appear. Hub of member 145 adjacent to driving member 144 is provided with clutch teeth while the hub on the opposite side of disk 146 is operably connected to hub of worm gear 138 by means of interengaging tooth members or splines 148, this clutch construction resembling that shown in Figure 18, Sheet 6. Helical spring 149' tends to push driven member 145 of jaw clutch 141 into engagement with the driving member 144 to thereby cause simultaneous rotation of gears 138 and 142. The upward movement of gear 138 is prevented by a shoulder in shaft 139 due to a reduction in the diameter of the shaft through the gear. Downward movement of gear 138 is resisted by helical spring 149'. The purpose of jaw clutch 141 will hereinafter fully appear under the disclosure of the carriage return function of the present apparatus.

From the foregoing it will be observed that the spacing takes place automatically with the printing of each character, that is, the spacing function is merged into the printing operation. It is obvious, that there is a code combination individual to each typebar. It is possible, however, to adopt a code combination commonly known as the spacing signal which is identified with no typebar but which will nevertheless inaugurate the printing operation. Therefore, the spacing between words is accomplished in exactly the same manner as hereinbefore set forth, when a spacing signal is received, except that no typebar is operated and consequently no character is printed. Incidentally, a special adaptation of the spacing function will hereinafter appear under the disclosure of the platen shift and unshift functions.

*Auxiliary selections and functions*

In addition to the printing of characters as hereinbefore described, we have provided for various functions such as line feed, platen shift, platen unshift and automatic signaling. Also, we have provided for various operations and features such as the send-receive-break mechanism, mechanical motor-stop mechanism, and printing cut-out mechanism.

To perform these various functions we have provided special code or function levers 175 (Fig. 6, Sheet 4) which are pivotally mounted on function lever shaft 176 suitably mounted in vane frame unit 7. Each function lever is under the influence of an individual function lever spring 177 one end of which is secured to vertical arm of function lever and the other end being fastened to a spring bar 178 fixed to the vane frame. Springs 177 tend to rotate function levers in a clockwise direction, as viewed in Figure 6.

The vertical arms of function levers 175 are provided with bifurcated ends, substantially as shown. The edge of one of the bifurcations presented toward the vanes is provided with a series of notches, which correspond to a specific code. The other bifurcation is slightly inclined to cooperate with function lever bail 165 as hereinafter set forth. The substantial horizontal arms of function levers 175 are guided in function lever comb 179 fixed to vane frame at 181 and are adapted to cooperate with various function push bars, as for instance 182, as will more clearly appear hereinafter.

Function lever bail 165 (Figs. 6 and 11,

Sheets 4 and 5) is secured to printing bail 127 and is adapted to span all of the function levers 175. The ends of the bail 165 are turned down to provide a bearing or support for shaft 183. Loosely mounted on shaft 183 is a sleeve 184, the purpose of which is to eliminate friction as will hereinafter appear. Function lever bail 165 is also provided with upturned edges 185 which are adapted to span certain of the function levers 175 (see Fig. 11) for a purpose which will be hereinafter disclosed.

The power necessary to perform these various auxiliary functions is imparted by function bail 161 (Fig. 6, Sheet 4). This bail 161, as was hereinbefore mentioned, is rotatably mounted on bail shaft 125. Function bail 161 is provided with arm 186 at the end of which is mounted a follower roller 187 adapted to cooperate with function cam 190, rotatable with the main shaft 76. Free end of bail 161 is provided with function bail blade 188 which is adapted to span all of the function push-bars and to cooperate therewith.

Function cam 190 on shaft 76 acts upon follower roller 187 and tends to rotate function bail 161 in a clockwise direction about bail shaft 125 (as viewed in Fig. 6), causing bail blade 188 to engage selected function push bar, as will hereinafter appear, and urge same to the left to perform its prescribed function. Upon completion of this movement function bail is released by function cam and is returned to its normal position by means of spring 189, one end of which is secured to function bail 161 and the other end suitably fixed to vane frame 7.

Referring to Fig. 8, Sheet 4, vane locking lever 191 pivotally mounted on function lever shaft 176 is provided with a bifurcated end, one bifurcation of which is provided, on its edge presented toward the selector vanes 36 to 40 inclusive and 50, with specially formed or double notches 192 substantially as shown, the purpose of which is to lock the selector vanes 36 to 40 and 50 in their selected positions to prevent disarrangement due to vibration or other causes, the selected vane being held in either the upper or lower apex of its associated notch. Normally, vane lock 191 is held out of engagement with selector vanes by the action of shaft 183 of function lever bail 165 against the inclined inner surface 193 of fork 194 against the tension of individual spring 177. Now, when printing bail is rotated in a clockwise direction (as viewed in Fig. 6) shaft 183 will describe an arc such that shaft 183 will be moved to the right thereby releasing vanelock lever 191 which is free to rotate about shaft 176 in a clockwise direction under the influence of its individual spring 177 into engagement with the selector vanes. Each of the function levers is similarly actuated.

By reason of this locking feature a new character may be selected while the preceding character is being printed. This is called the overlap and constitutes an important feature of our invention, and operates as follows.

When the selector vanes 36 to 40 are locked in selected position by lock vanes 191, the operating mechanism may move to select the next character, the selector fingers 26 being positioned for the next character but the T levers 29 being locked with the vanes 36 to 40. In this condition the spring 86 holds the selector fingers 26 in engagement with their respective T levers 29, and as soon as lock vane 191 releases vanes 36 to 40 by return of the printing bail, the T levers 29 at once move their vanes to the next position. It will be apparent that there is thus a flexible operating connection between the operating mechanism and the vanes 36 to 40.

It is obvious that when some of the functions are to be performed, the printing operation and movement of the type carriage must be suspended. To accomplish this the function lever bail 165 is provided with upturned edges 185 as seen in Fig. 6 Sheet 4, and Fig. 11, Sheet 5 and as hereinbefore noted. Now, when a function lever is selected wherein it is necessary to suspend the printing operation or carriage movement or both while the desired function is performed the upturned edge 185 is adapted to span said selected function lever and is intercepted by the upper edge 195 (Fig. 6) of said lever when said lever is pulled by its individual spring 177 into engagement with selector vanes. Printing bail is thereby prevented from rotating more than a slight distance under the influence of its striker spring 166 and the printing and carriage movements are prevented.

*Type carriage construction and return mechanism*

Referring to Fig. 3, Sheet 2 type carriage unit 3 comprises a rigid frame-work 152 upon which are mounted or supported the various parts hereinbefore mentioned and described such as, type-bars and pull-bars and their associated parts, pull-bar bail and its associated parts, carriage return rack, ribbon feed mechanism, ribbon vertical shift mechanism, and curved code bars.

As hereinbefore alluded to, type carriage unit 3 is movable as a whole from left to right step by step and returned as viewed in Figures 1 and 3, Sheets 1 and 2 to effect the line printing. To accommodate for this movement of the type carriage, vertically spaced rails or tracks 197 and 198 are provided which are mounted appropriately on the printing unit side frame 152. Type carriage frame 152 is provided with suitably mounted rollers 199 (Figs. 4 and 6), 201 and 202 (Figs. 1, 3, 4 and 6) and is slidably mounted on said rails 197 and 198. Rail 197 is cylindrical in cross section and rollers 201 and 202 are grooved so as to be laterally guided on said rail. Roller 199 cooperates with track or rail 198. Rail 197 is provided with an outwardly disposed lateral groove adapted to receive the head of carriage retaining screws 203 depending from carriage frame 152 and located behind mounting plate 49.

Mention has already been made, under our consideration of the spacing function, of the manner in which the type carriage is moved from left to right, step by step for line printing. When a full line has been printed or when it is desired to return the type carriage to the left to commence a new line a code combination of impulses is transmitted over the line which causes the selector mechanism 8 to initiate the selection of the proper function lever 175 in the hereinbefore prescribed manner.

Referring to Figure 6, Sheet 4, function lever 175 after being released by the function lever bail 165 in the manner hereinbefore set forth is allowed to rotate in a clockwise direction under the influence of its spring 177 to mesh with or engage the selector vanes which have assumed the selected positions to correspond with the series of notches in the selected function lever 175. This rotation has caused end 204 of horizontal arm of function lever 175 to raise the co-acting end of function push bar 182 so that said push bar 182 will rotate slightly in a counterclockwise direction about pivot 205 against the action of spring 206, thus disengaging notch 207 from latch or stop 208 fixed to comb 179 of vane frame unit 7. As shown, function push bars 182 and 209 are fulcrumed at common pivot 205 on one end of lever 210 which in turn is pivoted at 211 to base unit 1. To the other end 212 of lever 210 is secured one end of spring 213, the other of which is secured to base unit 1. Spring 213 normally tends to rotate lever 210 in a counterclockwise direction about pivot 211. The counterclockwise movement of lever 210 is limited by the adjustable stop screw 214 apropriately mounted on base unit 1.

Lever 210 is provided with laterally disposed portion 215 adapted to co-act with extension 216 of substantially U-shaped clutch release lever 147 fulcrumed on common pivot 211. Lever 147 is provided with a pair of arms 217 adapted to co-operate with annulus 146 of driven clutch member 145 to impart vertical reciprocative movement thereto. During the carriage return operation driven member 145 is held out of engagement with driving member 144 by the action of spring 213 upon lever 210, which tends to move in a counterclockwise direction about pivot 211 and which also tends to move lever 147 in the same direction through said laterally disposed portion 215.

As already mentioned, function push bars 182 and 209 are fulcrumed on common pivot 205 of lever 210. Levers 182 and 209 are acted upon by common spring 206, secured at 218 to lever 182 and at 219 to lever 209, which tends to rotate said levers about said pivot in opposite directions, thus it will be noted that lever 209 continues to bear against function bail 161 and lever 182 is held in contact with stop or catch 208. Now, when lever 182 is released in the manner hereinbefore described it will permit lever 210 to rotate in a counterclockwise direction under the influence of spring 213 thereby causing the release of driven clutch member 145 as hereinbefore set forth.

As seen from Figs. 3 and 6, Sheets 2 and 4, suitably mounted on cross bar 221 of printer unit frame is the spring return drum 222 comprising for the main part spring receptacle or drum 223, spiral spring 224 and draw strap 225 (Fig. 3). Draw strap 225 is suitably arranged to be wound about drum 223 and is riveted at one end to suitable hook 225, on type-carriage frame. As the carriage advances step by step it winds up carriage return spring 224 and stores up energy therein in readiness to return the carriage. Now, when the carriage return signal is transmitted and the function lever 175 is allowed to trip push bar 182 and clutch member 145 is thereby released shaft 139 is free to rotate and the carriage return is effected through the release of the stored up energy in the spring 224.

Upon the completion of the carriage return operation the function bail 161, which is caused to rotate clockwise by reason of the function cam pushes the function push bar 209 to the left until notch 207 again engages stop or catch 208 at the same time rotating lever 210 in a clockwise direction thereby releasing clutch release lever 147 and permitting clutch member 145 to re-engage member 144 by reason of helical spring 149.

Figures 5, 5A:
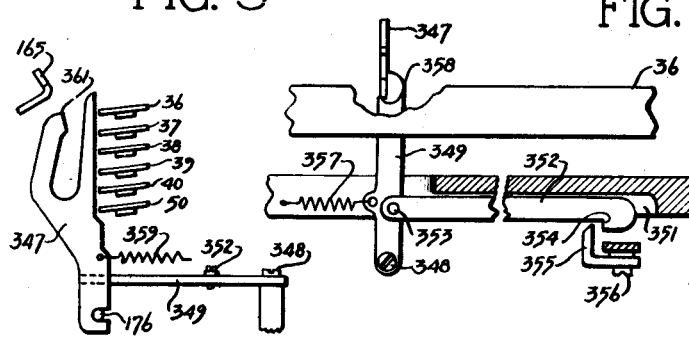
Figure 5 is a detail plan view of one embodiment of the printing cut-out mechanism.
Figure 5a is a broken plan view of the printing cut-out mechanism of Figure 5.

Means are also provided for the manual return of the type carriage. Referring to Figs. 5 and 15, Sheets 2 and 6, the carriage release lever 226 is suitably positioned on the rear part of the apparatus and is adapted to actuate a bell crank lever 227 which in turn actuates connecting link 228 (see also Fig. 6, Sheet 4) secured at one end to one arm of bell crank 227 and at the other end to one arm of clutch release lever 147. When lever 226, as viewed in Fig. 15, is urged to the left the connected series of levers are actuated to release clutch 141 (Fig. 6) to effect the return of the type carriage in a manner similar to that hereinbefore described.

When the return of the carriage is initiated manually by lever 226, spring actuated latch lever 226' engages a shoulder on lever 226 and operates to hold clutch 141 out of operative engagement until the carriage is returned, at which time lever 233 strikes end 220 of latch lever 226' imparting clockwise rotation thereto, thus unlatching lever 226 which is permitted to return again to the right to its normal position due to the action of its spring, not shown.

To absorb the blow or impact of the type carriage when it reaches the beginning of the line, we have provided a pneumatic buffer 229 (Figs. 4 and 15, Sheets 3 and 6) which is suitably supported to side frame 79 and located to the rear of the apparatus. Pivotally supported at 231 (Fig. 4) to side frame 79 and properly positioned with respect to buffer 229 and type carriage buffing post 232 is buffer lever 233. One end of lever 233 seen in Fig. 3, Sheet 2, Figure 4, Sheet 3 and Fig. 15, Sheet 6, is provided with antifriction roller 234 and is adapted to cooperate with plunger 235 of the buffer 229. End 236 (Fig. 3) of lever 233 is adapted to receive the blow from buffing post 232. The resistance of pneumatic buffer 229 is variable by means of adjustable air ports in a well known manner. Spring 240, (Fig. 3) tends to rotate lever 233 in a counter-clockwise direction about pivot 231 to restore the buffer mechanism to its operative position.

*Line feed*

For the purpose of rotating the platen 4 to feed the paper and space between the lines of printed characters, special function lever 237 (Fig. 11, Sheet 5) is provided. To initiate the operation or function of line feeding a special code signal therefor is transmitted and the proper selection set up by the selector mechanism in the manner similar to carriage return operation hereinbefore described. Consequently, function lever 237 is allowed to rotate about the common fulcrum 176 for the function levers to raise line feed push bar 238 into the path of the function bail 161 as hereinbefore similarly set forth under the carriage return. The opposite end of push bar 238 is pivotally connected at 239 (Fig. 4, Sheet 3) to arm 241 of substantially U-shaped bell crank lever 242. Lever 242 is pivotally supported at 243 to printing unit 2. Pivotally connected at end 244 of arm 245 of lever 242 is one end of line feed link 246, the length of which is adjustable by means of turnbuckle 247.

The other end of line feed link 246 is pivotally connected at 248 to arm 249 of line feed bell crank lever 251 (Fig. 7, Sheet 4) which in turn is pivotally supported at 252 to printing unit side frame, not shown. Pivotally connected to end of arm 253 of lever 251 is line feed pawl 254 which is adapted to cooperate with line feed ratchet 255 fixed to platen 4. Now, it is apparent that, when line feed push bar 238 is pushed to the rear by function bail 161 lever 242 is caused to rotate in a clockwise sense and in turn causing lever 251 through link 246 to rotate in the opposite direction, which rotation causes pawl 254 to be moved toward the left, as viewed in Fig. 7 to engage a tooth on ratchet 255 and rotate platen one step. Pawl 254 may be either spring or gravity operated.

It may be desired to advance the platen through an angle equal to two teeth for double spacing. We have provided for this by means of adjustable U-shaped lever 256 (Figs. 1, 3, 4 and 7) pivotally mounted for screw and slot adjusting to side frame 79. Referring to Fig. 7, Sheet 4, lever 256 (partly shown) is provided with shelf 257 which is adapted to be interposed between pawl 254 and ratchet 255. The position assumed by this shelf through the adjustability of lever 256 determines whether pawl 254 shall intercept one tooth or two teeth at a time; that is, it determines the time that pawl 254 will be allowed to fall into engagement with ratchet 255. A holding member 256 (Fig. 1) carrying a jockey roller 259 adapted to cooperate with star wheel 261 fixed to platen 4 on the end opposite to ratchet 255 is provided to prevent overthrow and to hold the ratchet wheel in its advanced position in a manner as is well known in the art.

*Platen shift and unshift*

The type bars are provided with two rows of type faces the lower row of which is the one normally used. When it is desired to print from the top row of type faces the shifting operation is accomplished in the following manner: A special signal corresponding to the code for platen shift, or "figures" shift as it is also called, is transmitted in the manner similar to that set forth in the foregoing description under carriage return and line feed. The corresponding function lever, called the "figures" or platen shift function lever is thereby permitted to rotate about common fulcrum 176 to raise platen shift push bar 262 (Fig. 11, Sheet 5) into the path of function bail 161 as hereinbefore set forth for similar function levers.

The other end of push bar 262 is operably connected to one end 263 of shift lever 264 which is pivotally mounted at 265 to printing unit 2. The other end 266 of shift lever 264 is adapted to be operably connected to tongued end 267 (Fig. 4, Sheet 3) of arm 268 of bell crank lever 269 which is pivotally mounted at 271 to side frame 79, as seen in Fig. 4, Sheet 3. To the end 272 of the other arm of the bell crank lever 269 is pivotally connected one end of shift link 273, the length of which is adjustable by means of turnbuckle 274, Fig. 7, Sheet 4. The other end of shift link 273 is pivotally connected at 275 to extension 276 of platen frame 277 (Figs. 1, 3, 4, 6 and 7, Sheets 1 to 4). Platen frame 277 is pivotally supported at 278 and 279 to side frames 79 and 81 respectively.

When platen frame is to be shifted to the

"figures" position; that is, to print from the upper row of type faces, it is rotated slightly in a counter-clockwise direction as viewed in Figs. 4, 6 and 7 in the following manner. When platen shift push bar 262 is permitted to cooperate with the function bail 161 as hereinbefore set forth it will be pushed thereby toward the rear imparting counterclockwise motion (as viewed in Fig. 11, Sheet 5) to shift lever 264 which in turn causes bell crank 269 to rotate in like direction (as viewed in Fig. 4, Sheet 3). Shift link 273 thus will be pulled downwardly causing platen frame to rotate in a counterclockwise direction.

Now, in order to return, or unshift, the platen so that the lower row of type faces may again be printed, a special signal corresponding to the code for platen unshift, also called "letters" unshift, is transmitted. The corresponding function lever, called the "letters" or platen unshift function lever is consequently selected and is caused to raise the platen unshift push bar 281 (Fig. 11, Sheet 5) into the path of function bail 161 to be acted upon thereby. End of push bar 281 opposite that which engages the function bail is operably connected to shift-lever 264 at a point 282 between fulcrum 265 and end 266.

So, assuming that platen is still in its shift position, shift lever 264 will be positioned at its extreme counter-clockwise point (as viewed in Fig. 11). The action of function bail 161 in response to an unshift code selection, will urge push bar 281 toward the rear to impart clockwise motion to shift lever 264 and, through end 266, the same kind of motion is imparted to bell crank 269, (Fig. 4) thus pushing shift link 273 upwardly to impart rotation in a clockwise direction to platen frame 277 about its pivot 278. Platen 4 is thereby again lowered to the unshift position to accommodate the printing from the lower row of type faces.

Since the platen must be correctly positioned in either the shift or unshift positions, so that the type face will strike the platen at the proper point to effect the best impression, we have provided means for obtaining the proper adjustment therefor. Referring to Figure 4, sheet 3, extension 276 of platen frame 277 is provided with lug 283 adapted to be interposed for reciprocative motion between jaws 284 and 285 of side frame 79, said motion being limited by adjusting screws 286 and 287 suitably mounted in said jaw.

We have also provided means for positively holding the platen in either the shift or unshift position. Again referring to Fig. 4, we have provided detent lever 288, pivotally mounted at 289 to side frame 79 and adapted to co-act with post or pin 291 near end of extension arm 276 of platen frame 277. Presented to post 291 near end of lever 288 is V-shaped projection 292. Lever 288 constantly tends to rotate toward post 291 under tension of spring 293, one end of which is secured to lever 288 substantially intermediate of its length and the other end secured to side frame 79, so that either one face or the other of the V-shaped projection 292 bears against post 291. That is, when platen is in the shift position post 291 will bear against lower face of projection 292, and when platen is in the unshift position post 291 will bear against the upper face.

The upper row of type faces contains many characters such as comma, semi-colon, period, etc., which are very frequently used at the end of a word, and in order to record this punctuation, return the platen to the unshift position, to space and then print the succeeding word several signals have to be transmitted. We propose to reduce the number of steps required by combining the unshift and the word spacing operations in the following manner.

We have provided a special function lever called the space and unshift function lever 294 (Fig. 11, Sheet 5, and Figs. 9 and 10, Sheet 4) which has its end 295 so formed laterally as to be normally disposed below the unshift push bar 281 to cooperate therewith. When function lever 294 is selected and caused to rotate about the common fulcrum 176 under the influence of its individual spring 177 end 295 will raise push bar 281 into the path of function bail 161 to accomplish the unshift operation simultaneously with the previously described spacing operation.

As has been hereinbefore described, the spacing function normally takes place in the unshift or "letters" position without the instrumentality of the space and unshift function lever 294. The space and unshift function lever 294 is caused to operate, nevertheless, each time the space signal is received, but since the platen is already in the unshift position platen unshift push bar 281 is therefore out of operative relationship with function bail 161 and consequently is not affected by said bail.

*The sixth vane*

We have also provided means consisting of an additional or "sixth" vane controlled solely by the platen shift and unshift mechanism whereby the range of operations of the apparatus is increased and by reason of which additional auxiliary operations or functions can be performed. Referring to Figs. 9 and 10, Sheet 4, the code-impulse selector vanes are shown at 36, 37, 38, 39 and 40 and the "sixth" vane at 50. Incidentally, the "sixth" vane 50 is not affected by a signal impulse but is affected only by the shifting and unshifting of the platen, as follows. When platen unshift push bar 281 has been urged to its extreme rearward position by the function bail 161 to effect the unshifting of the platen to the "letters" position, sixth vane 50 will assume the position shown in Fig. 10 under the influence of a spring 290 fixed thereto. When push bar 281 has been moved to its extreme frontward position by the action of shift push bar 262 upon the shift lever 264, as hereinbefore noted, to effect the shifting of the platen to the "figures" position, sixth vane 50 will assume the position shown in Figure 9 through the medium of said spring 290. It will become apparent as the disclosure proceeds that the sole function of the sixth vane is to assist in the operations of automatic signaling and motor control. In each of these instances the respective function levers have included in their series of code notches a bottom notch so disposed as to permit vane 50 to enter therein, when either function lever is caused to rotate about fulcrum 176, only if said vane 50 has assumed the "shift" or figure position. Since the "sixth" vane 50 is positioned by yieldable spring 290 we have assured its fixity of position by means of jockey roller 290' (Fig. 4 Sheet 3) suitably mounted on lever arm 296 which is actuated by spring 300, substantially as shown.

*Automatic signaling*

It is frequently desirable that the sending operator be able to signal the receiving operator. In order to do this a special signal is transmitted over the line to select function lever 298 Figs. 11 and 24, Sheets 5 and 7, which is accomplished in the hereinbefore prescribed manner. Consequently, signal function lever 298, Fig. 24, is permitted to rotate in a clockwise direction about common fulcrum 176 causing end 299 to raise or trip end 301 of latch bar 302 which causes the signal bell to be rung in the following manner.

Pivotally mounted at 303, Figs. 11 and 24, is U-shaped lever 304 to one end 305 of which is mounted bell-striker 306. The other end 307 of lever 304 is adapted to cooperate with laterally disposed end 308 of substantially T-shaped lever 309 also mounted on same pivot 303. To the end of arm 311 of lever 309 is secured one end of spring 312 the other end of which is secured to printing unit. To the end 313 of lever 309 are pivotally connected latch bar 302 and signal push bar 314. Latch bar 302 is provided with arm 315 to the extremity of which is secured one end of spring 316, the other end of which is attached to push bar 314 at a point 317 removed from pivot 313 substantially as shown. Spring 316 normally tends to rotate push bar 314 in counterclockwise direction, as viewed in Fig. 24, and to rotate latch bar 302 in the opposite direction. The free end of push bar 314, therefore, normally tends to bear against function bail 161 and latch bar tends to bear against the stop 318.

Now, when latch bar 302 is tripped or raised as hereinbefore mentioned, offset 319 becomes unlatched from stop 318 thus freeing latch bar 302. Latch bar 302 being thus freed, lever 309 is permitted to rotate swiftly in a counter-clockwise direction under the influence of spring 312. The amount of this rotation is limited by the second offset 321 on latch bar 302, which by reason of its pivotal relation with lever 309 is caused to move toward the right until offset 321 is arrested by stop 318. However, due to this sudden and limited rotation bell striker lever 304 is thrown to the left about pivot 303 by reason of the cooperative relationship between its arm 307 and laterally disposed end 308 of lever 309 with sufficient momentum to ring the signal bell 310. Bell striker may be returned to normal by either spring or gravity means.

Signal push bar 314 has also advanced to the right with latch bar 302 by reason of its pivotal connection at point 313 to lever 309 until offset 322 almost touches function bail blade 188 on the function bail 161. Now, when function bail operates, as hereinbefore described, it will urge push bar 314 to the left and cause lever 309 to rotate in a clockwise direction against the action of spring 312, thereby carrying latch bar 302 also to the left by reason of its pivotal connection at 313, until offset 319 again engages stop 318, thereby restoring signal bell operating mechanism to normal.

*Adjustable paper roll tension*

Referring to Figure 6, Sheet 4, paper roll 5 is mounted at the rear of the apparatus between side frames 79 and 81. It is adapted to roll on shaft 323 suitably journaled in said side frames. Before introducing the paper 324 into the platen unit in a well known manner, the paper is passed over the paper tension bar 325 suitably mounted at the extremities of arms 326 of a pair of bell crank levers 327 appropriately pivoted at points 328 on a pair of extension arms 276 of platen frame 277 to the extremity of the other arm 329 of each of said bell crank levers 327 is attached one end of a spring 331 the other end of which is secured to side frame 79 or 81. Thus bell cranks 327 always tend to rotate in a counter-clockwise sense about their respective pivots 328 to hold the paper taut. The advantage of this is readily discerned when it is noted that the oscillatory movement of platen in shifting and unshifting constantly alters the tightness of the paper between the paper roll and the platen. This variation in the tension is thereby automatically eliminated by this constant tendency of the tension mechanism to hold the paper taut.

Referring to Figs. 3 and 4, Sheets 2 and 3, it will be noted that the ends of paper roll shaft 323 are provided with projecting pins 332 which are adapted to rest in open sided bearings 333 in side frames, to permit quick replacement of paper rolls. These bearing pins 332 are retained in their bearings by means of slidably mounted retainers 334, substantially as shown.

Spacing cut-out function

To prevent serious damage to the printing apparatus due to the loss or transformation of the carriage return signal in transmission over the line, we have provided a means for cutting-out the spacing operation after the type carriage has reached the end of a predetermined length of line. The carriage return code signal may have been transmitted correctly by the sending station but in transmission over the line it may have lost or gained an impulse thereby changing the identity of the signal. Therefore, if a carriage return code signal thus is lost or transformed the carriage will not be returned at the end of the line preparatory to beginning the next line and the spacing operation will continue to be performed thus tending to urge the type carriage beyond the limits of the apparatus and consequently causing damage to the spacing mechanism. We have precluded this occurrence in the following manner.

Referring to Fig. 18, Sheet 6, the printing cut-out blocking lever 335 is pivoted at 336 to bracket 337 which in turn is suitably fixed to cross bar 221 of printer frame (Fig. 6, Sheet 4) and appropriately located thereon to cooperate with a three-toothed disk 116, hereinbefore alluded to, which rotates on main shaft 76 in accordance with spacing ratchet 114, hereinbefore described. Mounted on arm 338 integral with type carriage frame 152 is adjustable stop screw 339. Stop screw 339 is adapted to be properly aligned with arm 341 of lever 335 which is constantly urged against stop 342 by spring 343. Now, screw 339, and lever 335 are so adjusted and arranged that when the type carriage has reached a point coinciding with the printing of the last character of a predetermined length of line, screw 339 will strike arm 341 of lever 335 causing said lever 335 to rotate about its pivot 336 in a counter-clockwise direction (as viewed in Fig. 18) against the action of spring 343, thereby introducing end 344 of said lever 335 into the path of teeth 345 of disk 116. Laterally disposed arm 346 merely serves to limit the movement of lever 335.

We have already observed under the disclosure of the spacing function how the spacing ratchet is permitted to be stepped along one third of a revolution at a time. Being splined to ratchet member 114 at 117, disk 116 is thereby constrained to move in harmony therewith. The introduction of said end 344 into the path of teeth 345 therefore provides a means to positively stop the spacing function and consequently the further advance of the type carriage.

Printing cut-out mechanism

In the foregoing is disclosed a manner of precluding damage to the printing apparatus, when a carriage return signal is lost or transformed in transit thereby altering its identity, by cutting out the spacing operation. If a carriage return signal thus is lost, the characters will continue to be printed while the type carriage is at rest at the end of the line. We have provided therefore, a means whereby this piling up of characters at the end of a line will be prevented and which means also prevents the spacing operation from being performed.

A preferred embodiment of this printing cut-out feature is shown in Figs. 5 and 5A, Sheet 3. In this instance we have provided a special function lever 347, Fig. 5. Pivotally mounted at 348 on the bed of the vane frame unit 7 and substantially in front of function lever 347 and adapted to cooperate therewith is lever 349. Appropriately seated in vane frame at 351 and slidably mounted for longitudinal movement therewith is slide 352 one end of which is pivotally connected at 353 to lever 349. The other end of slide 352 is provided with catch 354 adapted to cooperate with interceptor 355, appropriately mounted at 356 (Fig. 1) on bell crank mounting plate 49. Spring 357, one end of which is attached to lever 349 and the other end secured to vane frame, tends to rotate lever 349 in a counter-clockwise direction about pivot 348 (as viewed in Fig. 5A) so that notch 358 normally engages function lever 347 to hold said lever 347 out of operative relationship with function lever bail 165 as will hereinafter appear.

Interceptor 355 by virtue of its connection with mounting plate 49 is adapted to move with the type carriage. Now, when the type carriage has reached a point coincident with the end of a predetermined line interceptor 355 engages catch 354 and urges slide 352 to the right sufficiently to trip lever 349 out of engagement with function lever 347. Referring to Fig. 5, function lever 347 is now free to rotate about fulcrum 176 in a clockwise direction under the influence of spring 359 so that edge 361 intercepts bail 165 as hereinbefore disclosed to prevent both the printing of a character and the movement of the type carriage.

Ribbon feed mechanism

We have provided means for winding the inking ribbon from one spool to another and automatic means for reversing same.

Referring to Figs. 12 and 13 it will be noted that printing plunger 149 which reciprocates with strike bar 66 is provided with an arm 362 having a notched end 363 adapted to receive and cooperate with rounded end 364 to ribbon feed lever 365 suitably fulcrumed at 366 to type carriage frame 152. Mounted on lever 365 is ribbon feed pawl 367 adapted to co-act with ribbon feed ratchet 368 fixed to one end of shaft 369 suitably journaled to said frame 152. To the other end of shaft 369 is fixed gear 371 which meshes with gear 373 fixed to ribbon feed shaft 372. As plunger 149 reciprocates backwards and forwards the ribbon feed pawl 367 tends to rotate ratchet 368 step by step in the usual manner, which motion is imparted to ribbon feed shaft 372 through gears 371 and 373.

The ribbon feed shaft 372 is constructed so as to move from side to side as well as to revolve and it is provided with a pair of bevel gears 374, one fixed at each end. The shaft 372 may be moved endwise so that the left hand bevel gear 374 meshes with the bevel gear 375 on the left hand ribbon spool shaft 376, or to the right so that the right hand bevel gear 374 meshes with bevel gear 377 on the right hand spool shaft 378. The ribbon feed pawl drives the lefthand ribbon spool 379 when the ribbon feed shaft is to the left and drives the right hand ribbon spool 381 when the ribbon feed shaft 372 is to the right (see Fig. 3, Sheet 2). The ribbon feed shaft is automatically moved to the right when the ribbon on the right hand spool becomes exhausted and to the left when the ribbon on the left hand spool becomes exhausted.

This is accomplished as follows: Referring to Fig. 12, Sheet 5, left-hand bevel gear 374 is in mesh with bevel gear 375 on left hand ribbon spool shaft 376. With the ribbon feed mechanism thus positioned, the ribbon moves from right to left, winding up on the left hand spool and unwinding from the right hand spool. To automatically effect the reversal of the ribbon feed we have provided a pair of ribbon reverse arms 382 of which only the left hand arm is fully shown in Fig. 12, the right hand arm being partly shown. Reverse arms 382 are each provided with a laterally disposed portion 383 adapted to permit the threading of ribbon through a slit 384 therein (see Fig. 14, Sheet 5). A rivet is provided near each end of the ribbon so that when the ribbon on the right hand spool, in the instance under consideration, is nearly exhausted, the rivet near the end of the ribbon failing to pass through the slit 384 thereby causes the right hand reverse arm 382 to be slightly rotated about its shaft 385 due to the pull of the left hand spool upon the ribbon. Reverse arms 382 are fixed to the upper end of shafts 385 to the lower ends of which are fixed shaft arms 386. The outer end of each shaft arm 386 is pivotally connected to one end of a pair of links 387 the other end of each of which is pivotally connected to one end of each of a pair of ribbon reverse pawls 388 each having a tooth or shoulder 388′ thereon. The other end of each of the ribbon reverse pawls 388 are pivotally connected to one arm of a pair of bell crank shaped ribbon reverse levers 389 rotatably mounted at 390 to carriage frame, the other arm of each of which is operably connected to ribbon feed shaft 372. It will be noted that a spring 391′ connects reverse pawls 388 with their respective bell cranks 389 to return pawls 388 to inoperative position after the ribbon reversal has been accomplished. Now, when right hand ribbon reverse arm 382 thus is rotated, right hand shaft 385 and shaft arm 386 also are actuated. Right hand shaft arm 386 thus is rotated in a clockwise direction, as viewed in Fig. 12, causing right-hand link 387 to be moved toward the right thereby causing right hand pawl 388 to rotate in a counter-clockwise direction about its pivot 391, for a purpose which will hereinafter appear.

To the outside of the reciprocating printing plunger 149 is secured ribbon reverse bail 392, the ends of which are laterally disposed to cooperate with shoulders 388′ of ribbon reverse pawls 388, as will presently appear. Incidentally, shoulder screws 393 and helical springs 394 provide buffer action to bail 392 to prevent jamming of the ribbon reverse mechanism. Now, the rotation of pawl 388 as hereinbefore described, moves the shoulder 388′ of said pawl into the path of bail 392, which has reciprocative motion imparted to it by the plunger 149. Therefore, on the inward travel of bail 392 pawl 388 is carried along with it, thus imparting rotation in a clockwise direction to bell crank lever 389 which in turn carries shaft 372 and its associated parts as a unit toward the right, causing the right hand bevel gear 374 to mesh with the right hand bevel gear 377 thereby effecting the reversal of the ribbon feed, V-shaped disk 395 coacting with keeper 396 in either its right hand or its left hand position to maintain the ribbon reverse mechanism in its set position until the next reversal thereof.

*Visible typewriting*

We have also provided means for reciprocating the inking ribbon vertically so that when a character is to be printed the ribbon will rise and become properly interposed between the type face and the paper, and after the printing is completed the ribbon will again be withdrawn thus making the writing on the paper visible. This is effected in the following manner: Referring to Figure 6, Sheet 4, lever 397 is pivoted at 398 to one end of lever 399, which is pivoted at 400. Lever 399, between pivotal points 398 and 400, is fashioned to carry a roller 401 which is adapted to have contactual relation with the bottom side of rail 402 carried on platen unit 4, due to the action of spring 403, one end of which is secured to end 404 of lever 399.

Spring 403 tends to rotate lever 399 in a counter-clockwise direction about pivot 400 so that when the platen 71 is reciprocated between its shift and unshift positions, roller 401 will constantly contact with said rail 402, and lever 397 thus will be automatically reciprocated therewith.

To end 405 of lever 397 is pivotally connected for vertical reciprocative motion ribbon guide bar 410. Stem 420 of T-lever 397 is adapted to be operably associated with plunger 149 so that the reciprocative motion of said plunger will cause the oscillation of T-lever 397 about fulcrum 398, whether platen 71 is in its shift or unshift position. Thus it will be noted that when plunger 149 is in the inoperative or normal position the T-lever 397 will hold the ribbon by reason of its guide 410 in its down position to effect visibility of the printed character, and when plunger 149 moves to the right, as viewed in Figure 6, for a printing operation the ribbon will be raised to printing position due to the counter-clockwise movement of T-lever 397 about pivot 398.

Margin signal bell

Means has also been provided for announcing to the operator that the type carriage is approaching the end of a line. (See Figures 16 and 17, Sheet 6.) Referring to Figure 16, we have provided shaft 406 appropriately mounted in the printing unit to one end of which is fixed bell striker arm 407 adapted to cooperate with signal bell 408, substantially as shown. Slidably mounted on shaft 406 and adapted to be adjustably set in accordance with the length of line desired is substantially U-shaped shaft arm 409, the free end of which is provided with inclined edge 411, adapted to cooperate with tripper 412 suitably positioned in the type carriage unit 3. When the carriage advances step by step to effect a printed line the tripper 412, when the end of the line is approximated, will force inclined edge 411 downward causing shaft 406 to revolve slightly and carry bell striker arm away from the signal bell preparatory to striking the bell. Immediately after the tripper has passed the shaft arm 409 and has become disengaged therefrom, the bell striker arm will be instantly returned to its normal position under the influence of its spring 413 at the same time the signal bell will be rung by arm 407 and thereby warning the operator of the approach of the end of the line. On return of the type carriage to the right of Fig. 16 the tripper arm 412 may rotate about its pivot to thus pass over member 409.

Send-receive break mechanism

Means whereby the sending operator may signal the receiving operator have already been set forth. We have also provided automatic means whereby the receiving operator may interrupt the sending operator either to have said sending operator repeat part of the message or as sometimes occurs the receiving operator may in turn wish to send to the sending operator or station a message of greater importance or urgency and so we have provided means whereby said receiving operator may stop the printer at the other end and begin to transmit his own message.

Figure 27:
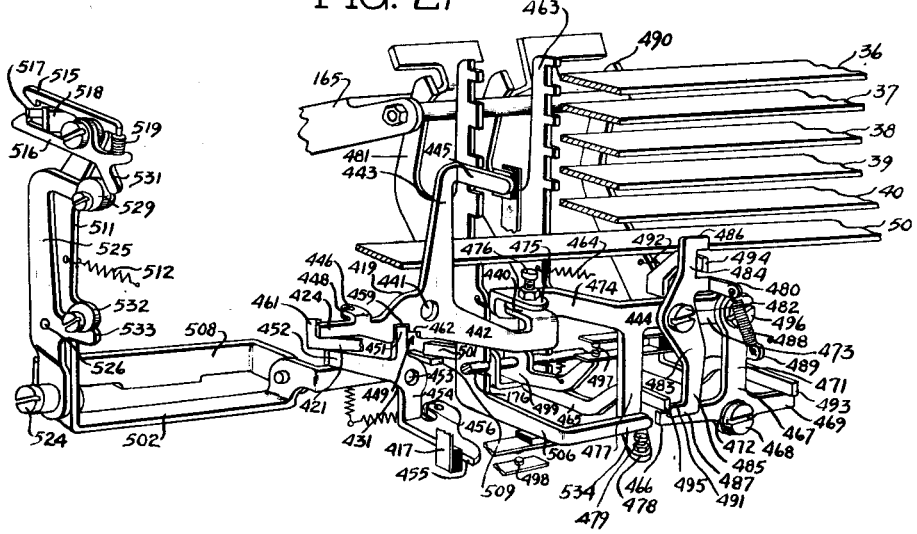
Figure 27 is a perspective view, with certain parts removed for clarity, of the break mechanism and motor control mechanism.

This break mechanism, shown in Figs. 1, 2 and 27, Sheets 1 and 8, which we have provided is located on the front side of the apparatus and substantially to the left side, to be the most conveniently situated for the use of the operator. Incidentally, the send-receive break mechanism, which we are about to describe, consists of two major parts, one of which is located on the base unit 1 of the printing apparatus and the other part is attached to the printing unit 2, such that the printing unit may be lifted from the base unit without disturbing any of the adjustments between the two parts of the said break mechanism.

Referring to Figure 1, that part of the break mechanism associated with base unit 1 is mounted on bracket 414 which is fixed to said base unit the two aforementioned parts of said break mechanism being separable at 400. That part of the break mechanism which is located on the base unit consists, for the main part of three electrical contacts 416, 417 and 418, Figs. 1 and 2, which may be operated either by hand through lever 421 from a position occupied by the operator of the printer apparatus; or by a lever 419 which in turn is controlled by levers in the printing unit of the apparatus. Contact 416 is located in the signal line and is used as a "break" contact in the signal line circuit. Contact 417 is so wired as to shunt the sending contacts on the keyboard, thereby rendering the keyboard inoperative. Contact 418 is wired so that it may be placed in the control circuit of the transmitting distributor. The reasons for the foregoing will be more clearly set forth as the disclosure proceeds.

Lever 421 (Fig. 2), by which that part of the break mechanism which is located on the base unit may be operated, can occupy one of three positions. The intermediate position (which position is illustrated in full in Fig. 2) is called the "receive" position, and the lowest position 420 is known as the "break" position, and the uppermost position indicated by character 410 is the "send" position. When the lever 421 is in the "send" position, contact 416 in the line circuit is closed, contact 417 shunting the keyboard contacts is open, and contact 418 in the transmitter distributor circuit, is closed. When lever 421 is in the "receive" position, contact 416 in the line circuit is still closed, contact 417 shunting the keyboard contacts is closed, and contact 418 in the transmitter distributor circuit is now open. In the extreme downward position of lever 421, known as the "break" position, contact 416 in the line circuit is now open, thereby cutting out the line circuit and contacts 417 and 418 are closed and open respectively. A detailed description of the foregoing will hereinafter appear.

Lever 421 is adapted to be moved manually to each of the three above mentioned positions. It may, however, be moved from the "send" to the "receive" position by means of a system of levers mechanically operated in the printing unit, as will hereinafter appear, but it must be restored from the "receive" to the "send" position manually. Further, lever 421 may be moved to the "break" position, hereinbefore alluded to, manually only, and may be shifted to this position only by depressing lever 422, Fig. 2, simultaneously with lever 421. The depression of lever 422 releases the safety locking pawl 423 from engagement with end 424 of lever 419, in a manner as will hereinafter appear. This simultaneous action will permit lever 421 to be moved from the "receive" position to the "break" position.

The send-receive break mechanism is shifted mechanically from the "send" position to the "receive" position by means of levers in the printing unit when two or more successive blank code signals are received by the selector mechanism 8, as will be hereinafter fully described.

That part of the send-receive break mechanism which is mounted on the main base 1 comprises aforementioned bracket 414 to which are appropriately mounted the contact switches 416, 417 and 418 of well known construction. Arms 425 and 426 of contact switches 417 and 418 respectively, are adapted to move together by reason of common insulator 427 secured thereto, as seen clearly in Fig. 30, sheet 9. Pivotally connected at 428 to arm 429 of bracket 414 are beforementioned levers 421 and 422. Lever 421 is adapted to cooperate with levers 419 and 431 as will hereinafter appear. Lever 422 is substantially T-shaped, one arm 432 of which is adapted to cooperate with arm 433 of safety locking pawl 423 hereinbefore mentioned. Pivotally connected at 434 to extension on bracket 414 and suitably positioned with relation to lever 422 is aforementioned safety pawl 423, to end 436 of which is secured to one end of spring 437 the other end of which is secured to arm 438 of lever 422.

Lever 422 is provided at 439 with a laterally disposed stop portion which is adapted to cooperate with a corresponding stop portion on said arm 429 of stationary bracket 414 to limit the counter-clockwise rotation (as viewed in Figure 2) of lever 422. Spring 437 tends to hold said stop 439 of lever 422 against arm 429 and said pawl 423 against lever 419 at end 424 in latching engagement therewith. Referring to Fig. 27, Sheet 8, lever 419 hereinbefore alluded to, is pivotally connected at 441 to rear wall of bracket 414, and is of substantially T-shaped construction comprising arms 424, 442, and 443. Arm 442 is provided with a laterally disposed portion 440 adapted to co-act with lever 444 of that part of the send-receive break mechanism associated with the printer unit 2. Vertical arm 443 of lever 419 is also provided with a laterally disposed arm 445 adapted to actuate contact switch 416 substantially as shown in Fig. 2. Arm 424 of lever 419 is provided at 446 with a laterally disposed portion to which is attached one end of spring 448 the other end of which is fixed to bracket 414. Arm 424 is also provided with a two-position or double notch 449 adapted to receive arm 451 of lever 431, as hereinafter described.

Appropriately positioned below lever 419 and pivotally connected at 453 to bracket 414 is three-armed lever 431, arm 451 of which has already been referred to. Arm 452 is adapted to cooperate with beforementioned lever 421. Arm 454 is provided with laterally disposed portion 455 adapted to actuate arms 425 and 426 of contact switches 417 and 418. To arm 454 is fastened one end of spring 456 the other end of which is fixed to bracket 414.

The manual operation of the send-receive break mechanism is performed as follows: We will assume that lever 421 has been rotated in a counter-clockwise direction about pivot 428 (viewed in Fig. 2) to its uppermost or send position, which position is substantially as shown by dotted lines, Fig. 2. In this position rear end of lever 421 is in engagement with end of arm 452 of lever 431 and said lever 431 has assumed the position, against the action of spring 456 such that arm 451 will rest in the deep portion 459 of double notch 449 (Fig. 27). This position is attained by reason of the fact that the downward movement of end 461 of lever 421 imparted counter-clockwise rotation to lever 431 thereby tripping arm 451 out of engagement with step 462 of notch 449, permitting lever 419 to rotate slightly in a counter-clockwise direction under the influence of spring 448. The assumption of this position by lever 431 tends to release laterally disposed portion 455 of lever 431 from engagement with contact switches 417 and 418, which are permitted to assume their normal position such that contact 418 is closed and contact 417 is open, as hereinbefore described. It will therefore be noted that this arrangement of levers places the send-receive break mechanism in the "send" position; because when the printing apparatus thus is placed in the sending position, three necessary things are accomplished (see Figure 29, Sheet 9). First, the printer is connected to the line to permit the transmission of the message to the distant station; that is, contact 416 is closed. Secondly, the keyboard is operably connected electrically to the printer so that messages can be constructed thereon; that is, contact 417 is open. Thirdly, the transmitter is connected into the circuit to permit the proper transmission of the message; that is, contact 418 is closed thereby permitting rotation of the transmitter distributor shaft. It is obvious, from the foregoing description of the "send" position of the break mechanism that these three things have been achieved.

Now it has been noted that to place the break mechanism in the "receive" position it is necessary to depress key end of lever 421 to the middle position, or that position shown in full lines in Fig. 2. This movement of lever 421 affects the associated lever mechanism in the following manner. Lever 421 being thus slightly rotated in a clockwise direction (viewed in Fig. 2) releases arm 452 of lever 431 and simultaneously raises arm 424 of lever 419 causing said lever 419 to rotate slightly in a clockwise direction sufficiently to permit lever 431 to rotate in a like direction about pivot 453 under the influence of spring 456 until arm 451 engages step 462 of double notch 449. This rotation of lever 431 causes laterally disposed portion 455 of arm 454 to actuate contacts 417 and 418 (Fig. 2) closing contact 417 and opening contact 418. Three conditions are requisite to place the printing apparatus in the "receive" position; that is, in a proper position to receive an incoming message. See Fig. 30, Sheet 9. The first requisite is that the line contact 416 must be closed so that the signals coming in over the line can actuate the printer. The second requirement is that contact 417 must be closed to render the keyboard inoperative; that is, the closing of the contact 417 shunts the keyboard contacts and thereby diverts the current which would otherwise traverse the keyboard circuit. The third requisite is that contact 418 must be opened to render the transmitting distributor inoperative by stopping rotation of its shaft since it is obvious that it is not feasible to send a message while receiving one on the same apparatus. It is thus apparent that the lever arrangement of the send-receive break mechanism just described effects the aforementioned conditions.

The purpose of the "break" position of the send-receive break mechanism and the reasons therefor will now be fully set forth. The lever set-up or arrangement resulting from the depression of the broad or key end of lever 421 is as follows. The further rotation of lever 421 in a clockwise direction (viewed in Fig. 2) about pivot 428 raises end 461 of said lever 421 to impart further rotative motion in a like sense to lever 419 about its pivot 441. Arm 443 is likewise rotated and is thereby brought into operative engagement with arm 462 of contact switch 416 (Fig. 2) and urges said arm to the right to open or break said contact 416.

The result of breaking this circuit is to de-energize the selector magnet 9 at the other end of the line, which, as has already been noted, is normally energized while the printer is in use or is connected to the line circuit. It has also been hereinbefore alluded to that in order to initiate the selection of a character or function a start pulse must be transmitted and that this pulse is of a spacing or no current nature, which upon de-energizing the selector magnet 9 causes the rotation of the cam barrel 82 to effect the selection of a character or function. Now, the de-energization of the selector magnet 9 by means of the herein described break mechanism is equivalent to its de-energization by means of the start pulse; that is, the effect is identical. So, when the lever 421 thus has been depressed to the lowest or "break" position the cam barrel 82 of the printing unit on the other end of the line will rotate, causing "blank" combinations to be set-up or selected. Therefore, when lever 421 is held down or depressed for a period equivalent to two or more "blank" signals or selections the apparatus at the other end of the line will be affected in the following manner:

For the purpose of illustration we will assume that the operator at one end of the line, whom we shall refer to as the sender is transmitting messages to the operator at the other or remote end of the line, whom we shall refer to as the receiver. Under these circumstances lever 421 of the sender's printing unit is in the "send" position and similar lever 421 of the receiver's printing unit is in the "receive" position. So, should the receiver desire to interrupt the sender for some reason, for instance to ask the sender to repeat his message, the receiver would simultaneously depress his levers 421 and 422 to the lowest or "break" position, holding same in that position for a short interval of time equivalent to the transmission of at least two signals. The result of this, as above noted, is to break the line circuit which is equivalent to transmitting no-current or spacing impulses, thereby initiating the operation of the sender's selector mechanism. "Blank" signals or combinations are therefore set up and the selector vanes 36 to 40 are so arranged as to effect the selection of the "blank" function lever 463, Figure 27. Function lever 463 is thereby permitted to rotate about common shaft 176 in a clockwise direction under the influence of its spring 464. Said function lever 463 is provided with an outwardly extending arm 465, adapted to cooperate with arm 466 of T-lever 467, in a manner to be presently described.

Referring to Fig. 27, T-lever 467 is pivotally connected at 468 to vane frame 7 and comprises arms 466, 469 and 471. T-lever 467 is adapted to oscillate or rock slightly to the right and left. When said lever 467 is rocked to the left about pivot 468 it assumes the "operated" position and to the right the "unoperated" position. Lever 467 is held in either of these positions by means of a spring washer 472. To the end of arm 471 of T-lever 467 is pivotally connected arm 473 of substantially T-shaped lever 444, hereinbefore alluded to. Arm 474 of lever 444 is provided with laterally disposed portion 475 adapted to overlap aforementioned portion 440 of lever 419 to cooperate therewith, said portion 440 having an adjusting screw 476 mounted thereon. The purpose of adjusting screw 476 is readily appreciated when it is recalled that the two main parts of the send-receive break mechanism are separable at this point and therefore are subject to misadjustment. The third arm 477 of T-lever 444 is substantially vertical and is provided with a laterally disposed portion 478 on which is suitably mounted adjusting screw 479 adapted to co-act with motor stop function lever 481, as will hereinafter appear.

Pivotally connected at 482 to arm 473 of T-lever 444 and appropriately positioned thereon with respect to T-lever 467 and blank function lever arm 465 is intermediate lever 483. Lever arms 484 and 485 of said lever 483 are provided at their ends with oppositely disposed portions 486 and 487, respectively, adapted to lie in the plane of rotation of said lever 483. Lever arm 484 is provided with projection 480 to which is attached one end of spring 488 the other end of which is secured to projection 489 on arm 471 of T-lever 467. Spring 488, therefore, does not affect T-lever 467, but tends to rotate intermediate lever 483 in a clockwise direction about pivot 482, thereby holding arm 484 against limiting stop 494, adjustably mounted on vane frame 7. Intermediate lever 483 is so positioned with respect to T-lever 467 that the upper surface 491 of portion 487 is disposed slightly above arm 466 of T-lever 467 for the purpose as will hereinafter appear. Lever 483 reposes in its normal position while T-lever 467 assumes its hereinbefore mentioned unoperated position. While in said normal position, lever 483 is so disposed that portion 487 is held clear of arm 465 of function lever 463 by means of stop member 494, because of the fact that the clockwise movement of T-lever 467 tends to carry the intermediate lever 483 toward the right, which movement is resisted by stop 494, thus causing lever 483 to rotate in a counter-clockwise direction about said stop 494 as a fulcrum.

Universal function lever 490 Fig. 27, is also rotatably mounted on common fulcrum 176 and is normally tending to rotate in a clockwise direction under the influence of its spring 492. Said lever 490 is not provided with any code notches and thereby tends to function during every cycle of operation. Universal lever 490 is provided with outwardly extending arm 493 which is adapted to cooperate with arm 469 of T-lever 467. As will hereinafter appear, universal function lever 490 constantly attempts to restore T-lever 467 to its unoperated position, but since its spring 492 is weaker than spring 464 individual to blank function lever 463 its influence upon T-lever 467 will not prevail while said T-lever 467 is under the influence of blank function lever 463.

We will now proceed to describe fully the mechanical operation of the send-receive break mechanism. We have hereinbefore noted the manner in which the blank function lever 463 is selected and that said lever 463 is provided with an extension 465 adapted to cooperate with arm 466 of T-lever 467. It is also adapted to cooperate with portion 487 of intermediate lever 483 when said portion 487 is swung into the downward path of said extension arm 465, in the manner presently to be described.

During the cycle of operations inaugurated by the first blank code signal, the consequent rotation of the blank function lever 463 and the resulting downward movement of extension arm 465 will impart slight rotation in a counter-clockwise direction to T-lever 467 about its pivot 468. T-lever 467 has now assumed its "operated" position and will hold this position due to the effect of spring washer 472. While thus rotating into its operated position T-lever 467 through its vertical arm 471 imparts motion toward the left to T-lever 444 which carries with it intermediate lever 483. Said lever 483 is thus caused to rotate in a clockwise direction about its pivot 482 under the influence of spring 488, but since, as has been noted, portion 487 of lever 483 is so disposed as to be slightly higher than said arm 466, it is apparent that end 495 of said portion 487 will bear against the side of said extension arm 465.

Now, such is the condition that always obtains when one blank signal is sent or received by the printer. In the normal transmission or reception of a message a blank signal is always followed by a character or function signal, the T-lever 467 thereby being restored to its normal or "unoperated" position. But, it was hereinbefore noted that the operation of the printing unit could not be interrupted except by the reception of a succeeding "blank" signal.

Upon the completion of the cycle inaugurated by the first "blank" signal, the "blank" function lever 463 is restored to its normal position by the function bail 165, as hereinbefore described, thereby raising extension arm 465 to its original position. T-lever 467 continues to assume its operative position due to the pressure of spring washer 472. Intermediate lever 483 is permitted to continue its rotation in a clockwise direction under the influence of spring 488 since the slight elevation of the end of the arm 465 due to the beforementioned restoration of function lever 463 to normal has caused the disengagement of portion 487 permitting it to be swung into the downward path of said arm 465 hereinbefore alluded to.

The break mechanism is now properly positioned to receive the second "blank" signal, which when received causes the selection and operation of blank function lever 463 in the manner hereinbefore described. The consequent downward movement of arm 465 will now be intercepted by portion 487 of intermediate lever 483. Lever 483 will thereby be urged downward and in turn impart rotative motion in a counter-clockwise direction to T-lever 444 about its pivot 496. This motion of T-lever 444 will impart through its overlapping portion 475 clockwise motion to hereinbefore mentioned lever 419. Lever 419 thus is caused to set the printer in the "receive" position, closing contact 417, thereby shunting the keyboard contacts; and opening contact 418, thereby stopping the rotation of the transmitter distributor shaft, in a manner as hereinbefore fully described.

The sender's printing apparatus is thereby automatically rendered inoperative insofar as his ability further to transmit messages is concerned, and perceiving the purpose of the interruption he awaits the message to be sent to him from the distant station. A full description of the electrical circuit which forms a part of our invention will appear hereinafter.

*Motor control mechanism*

The purpose of the motor control mechanism is to start and stop the printer motor by means of the signal line. We have provided that the printer motor shall be automatically stopped upon the reception of two similar code signals of predetermined combination successively transmitted. We have also provided that the motor shall then be automatically started upon the breaking of the signal line for a brief interval, as for instance, by depressing the levers 421 and 422 of the send-receive break mechanism as hereinbefore mentioned. The power supply from a local source is connected to the printer motor through the motor control contact switches 497 and 498, appropriately located at the front of the printer as shown in Fig. 27, Sheet 8.

Figure 31:
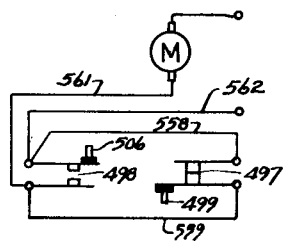
Figure 31 is a schematic diagram of the motor controlling circuit.

These contacts 497 and 498 are connected in parallel with each other and both are in series with the printer motor, as clearly illustrated in Fig. 31, Sheet 9. The right hand contact 497 is operated by lever 499, Figs. 27 and 28 and 31, Sheets 8 and 9, which closes said contact when the motor stop function lever 481 is in its unselected position, as will hereinafter appear, and said lever 499 also permits contact 497 to open due to its own spring tension when the motor stop function lever 481 is in its selected position. The left hand contact 498 is normally open and is closed only during the cycle of operations following the selection of the motor stop function lever 481, for the purpose of preventing the stopping of the motor while said lever 481 is in its selected position. Should the printer motor come to rest, while the motor stop function lever 481 is in the selected position, it would be impossible for lever 499 to close its associated contact 497 when it is again desired to start the motor. The foregoing will become apparent in the light of the following detailed disclosure.

Referring to Figs. 27 and 28, Sheet 8, function levers 481 and 499 are rotatably mounted on common fulcrum or shaft 176. One arm 501 of lever 499 (Fig. 28) is adapted to cooperate with substantially U-shaped motor-stop lever 502 and the other arm 503 coacts with contact 497 also lever 499 tends to rotate in a counterclockwise direction, as viewed in Fig. 28, under the influence of spring 504, one end of which is secured to arm 503 and the other end is suitably attached to vane frame unit 7. The normal tendency therefore, of lever 499 is to keep contact 497 closed. Motor stop function lever 481 is provided with a bifurcated arm similar to function lever 175, hereinbefore alluded to, and also a rearwardly extending arm 505 and a forwardly extending arm 506. Function lever 481 is conduced to clockwise rotation by its spring 507, but is normally restrained from such rotation by function bail 165, hereinbefore described. Arm 505 of lever 481 is adapted to cooperate with motor stop lever 502, and arm 506 is adapted to cooperate with T-lever 444, as will hereinafter appear.

Motor stop lever 502, is rotatably mounted on U-shaped bracket 508, Figure 27, which in turn is fixed to the selector mechanism unit 8. Said lever 502 comprises a substantially horizontal arm 509, adapted to co-act with arm 501 of lever 499; and a substantially vertical arm 511, to which is attached one end of spring 512. The other end of said spring 512 is secured to selector mechanism unit 8. The rotation of lever 502 in a clockwise direction is limited by suitably located stop 514 (Fig. 28) mounted on said selector unit 8.

Referring to Figures 25 and 26, Sheet 7, it will be seen that to the free end of arm 511 of motor stop lever 502 is pivotally connected a pair of latches comprising an upper latch 515 and a lower latch 516, adapted to engage extension 517 of armature lever 13. Said latches 515 and 516 normally tend to bear against stop 518 due to the distending action of spring 519. Armature lever extension 517 is provided with stop 521, with which lower latch 516 is adapted to engage. Upper latch 515 is adapted to engage inside face 523 of extension 517, the purpose of which will hereinafter appear.

Mounted on pivot 524, common also to lever 502, is release lever 525. Said release lever 525 is provided with pin or stud 526 fixed thereto and arranged to extend through slot 527 in lever 502 and adapted to cooperate with arm 528 of armature locking lever 70 (Fig. 21, Sheet 7). The free end of release lever 525 is provided with an eccentric adjusting screw 529 adapted to co-act with arm 531 of lower latch 516. Also, located substantially adjacent to pin 526 and secured to lever arm 511 is eccentric adjusting screw 532 adapted to cooperate with arm 533 of release lever 525.

As before mentioned, arm 506 of motor stop function lever 481 cooperates with T-lever 444. Referring to Fig. 27, Sheet 8, it will be noted that the laterally disposed end 534 of said arm 506 co-acts with adjusting screw 479. This operable relation between levers 481 and 444 is required to insure that the printing units will always be in communicative relation with each other; that is, that the signal line will always be closed at the completion of a cycle. As set forth in the hereinbefore mentioned Patent #1,595,472 relating to the keyboard associated with our invention, said keyboard in its transient operative positions is adapted to open and close the signal line. Now since the keyboard receives its power directly from the printer main shaft it is apparent that should the motor be stopped indiscriminately there is a possibility that the keyboard shaft be stopped while in an operating position with the line contact 530 (Figs. 3 and 29, Sheets 2 and 9) open, thereby rendering the printers non-communicative.

It has also been hereinbefore set forth that the automatic stopping of the motor is accomplished by the reception of two successive similar code signals namely the "figures-shift" signal. Upon the reception of the first of these signals the hereindescribed apparatus is affected in the following manner: It has been noted that the sixth vane 50 hereinbefore described is affected by the shifting or unshifting of the platen. Now, in order to render the motor stop function lever 481 operative, the sixth vane 50 must assume the position shown in Fig. 10, Sheet 4, which is the shift or "figures" position. Therefore, the first of the motor stop signals merely places the sixth vane 50 in the proper position to engage its respective notch in the motor stop function lever 481 to effect the selection and rotation of said lever 481. Upon the reception of the second motor stop signal, which also is the "figures" shift signal the selector vanes will assume their predetermined position to agree with the respective code notches in the motor stop function lever 481 allowing said lever 481 to rotate in a clockwise direction about fulcrum 178 under the influence of its spring 507. This rotative motion imparts through end 534 (Fig. 27, Sheet 8) of lever 481 and arm 477 of lever 444 counter-clockwise rotation to said lever 444, which through its end 475 affects lever 419 as hereinbefore fully described, thus causing the send-receive break mechanism to assume its "receive" position, thereby shunting the keyboard and ensuring the closing of the signal line. The rotation of the motor stop function lever 481, as above mentioned, also, through its arm 506, serves to close motor control switch 498 for the purpose hereinbefore disclosed.

This clockwise rotation of lever 481 imparts, through its arm 505, rotation in the opposite direction to motor stop lever 502 Fig. 28, Sheet 8. Arm 509 of lever 502 imparts clockwise rotation to contact operating lever 499 against the action of its spring 504, thereby releasing contact 497 so long as motor stop lever 502 is in the locked position presently to be set forth. The counter-clockwise rotation of arm 511 of lever 502 carries the pair of latches 515 and 516 mounted thereon to the left, so that upper latch 515 is caused to engage extension 517 of armature lever 13, since said armature lever is normally in the marking position due to the fact that selector magnet 9 is always energized while the printers are in communicative relation. Such is the condition of the printing apparatus while in the motor stop condition. It should be understood that as before mentioned, knife edge 140 is held out of engagement with knife edge 160. If such were not the case, and knife edge 140 were permitted to engage the underneath side of knife edge 160, (as shown in Fig. 21, Sheet 7) armature lever 13 would be locked between said knife edge 140 and upper latch 515, thereby rendering the printer inoperative.

Now, when it is desired to start the motors of the printers which are in communicative relation, the keys 421 and 422 of the send-receive break mechanism are depressed to the aforementioned "break" position and thus held for a period equivalent to at least two code signals. The signal line, therefore, as we have seen thus is broken causing selector magnet 9 to become deenergized. Said armature lever 13 will therefore rotate in a clockwise direction under the influence of its spring 15 thus disengaging latch 515 from extension 517. Extension 517 therefore will swing into the path of lower latch 516, so that said latch 516 will engage step 521 of extension 517. Thus it is apparent that should the signal line remain open the printer motors still are prevented from starting. It is only when the signal line is again closed; that is, when the levers 421 and 422 are released, that the printer motors will start. This is because selector magnet 9 is again energized causing the armature lever 13 to swing into the marking position, thus releasing lower latch 516 and allowing motor stop lever 502 to return to its normal position under the influence of its spring 512. This restoration of lever 502 to normal also releases motor contact lever 499 permitting it to return to its normal position under the influence of its spring 504 thereby closing the contact 497 in the motor circuit.

It may occur that when lower latch 516 is in engagement with extension 517, nose 100 of armature locking lever 70 (Fig. 21) might be engaged with one of the teeth or shoulders 130, in which case knife edge 140 of lever 70 would be in engagement with upper edge of knife-edge 160 thus preventing the further movement of armature lever 13 in either direction and consequently prevent the starting of the printer motors. To preclude this possibility we have provided aforementioned a release arm 525 which is adapted to cooperate through its pin 526 with lever 70 such that when nose 100 engages tooth in cam 120 thereby permitting lever 70 to rotate in a counter-clockwise direction about its pivot 90, arm 528 of lever 70 will urge pin 526 to the right thus imparting clockwise rotation to lever 525 which by reason of its engagement with arm 531 of latch 516 causes said latch to rotate in a counter-clockwise direction out of engagement with extension 517.

It is evident, therefore, that at no time can the motor control mechanism be rendered inoperative.

Although we have shown only two stations connected together it will be clearly understood that any number of stations may be connected together, the distant motor control and the send-receive break mechanisms operating as described in connection with the two station hook-up.

Figure 29:
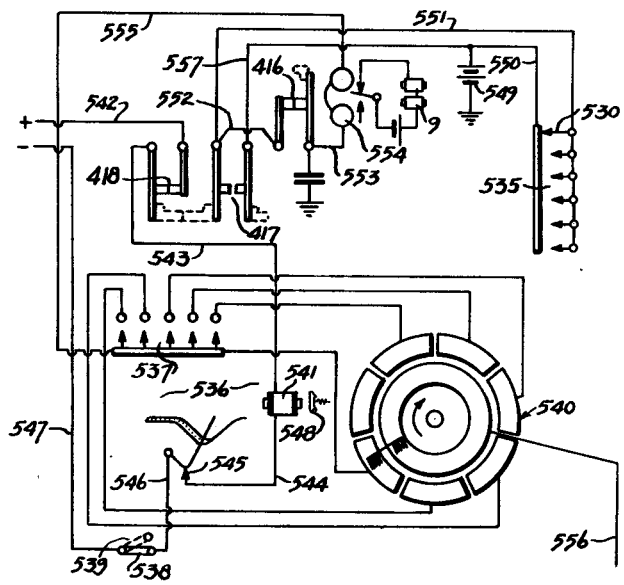
Figure 29 is a schematic diagram of the electrical circuit at sending station.
Figure 30:
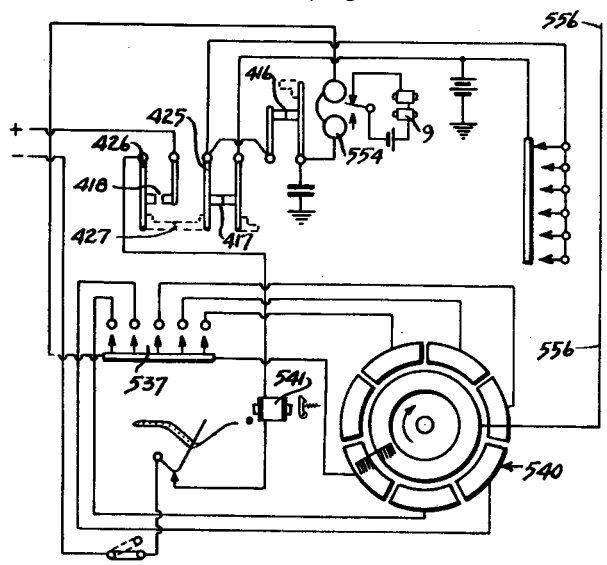
Figure 30 is a similar diagram of the electrical circuit at the receiving station.

The electrical circuit which form a part of our invention will now be disclosed. Figure 29, Sheet 9, illustrates schematically the circuit at the sending station, while the circuit at the receiving station is shown in Fig. 30. These circuits are identical and the same parts are designated by the same reference signs wherever they occur in both views.

Referring to Fig. 29 it will be noted that since the station which it represents is in the "send" position, contacts 416 and 418 are closed and contact 417 is open, as has been hereinbefore clearly set forth. Also, since the station illustrated in Fig. 30 is in the "receive" position its contacts 416 and 417 are closed and contact 418 is open. As is well known, messages can be transmitted from the "send" station either by means of a keyboard (not shown) through its contacts 535, or by means of a tape transmitter 536 through its contacts 537 and distributor 540.

If a tape transmitter is used, manually operated switch 538 is closed, as shown, but if the keyboard is used to transmit messages the tape transmitter switch is left open, as shown in dotted position 539. Assuming in the first instance, that the tape transmitter is used, the closing of the tape stop switch 538 will effect the energization of stop magnet 541 by the completion of a circuit from positive battery over conductor 542 through contact 418 of the send-receive-break mechanism, hereinbefore alluded to, over wire 543, through said magnet 541, over wire 544, through tape stop contact 545, over wire 546, through switch 538, over conductor 547, to negative battery. Energized magnet 541 thereupon attracts its armature 548 and initiates the operation of the transmitter in a well known manner.

We will next assume that the keyboard is used to transmit messages from the sending station (Fig. 29). In this case the manually operated tape stop switch 538 is opened thus rendering the tape transmitter inoperative. The electrical circuit for transmitting code signal impulses now is completed from grounded battery 549, over conductor 550, through keyboard contact 530, over wire 551, wire 552, through break contact or switch 416, over wire 553, through polar relay 554 (which controls selector magnet 9), over wire 555, through transmitting distributor 536, as shown, over line wire 556 to the receiving station. (Fig. 30.)

Thus should the receiving station (Fig. 30) desire to interrupt the sending station (Fig. 29) contact 416 in Fig. 30 will be manually held open momentarily thereby breaking contact 418 and closing contact 417 in Fig. 29 as hereinbefore clearly set forth. It will be noted that contacts 417 and 418 are always affected simultaneously. Opening the contact 418 (Fig. 29) thus breaks the circuit controlling the start magnet 541 (if said circuit is still closed) which magnet then becomes deenergized, thereby releasing its armature 548 allowing same to prevent rotation of distributor 540. The closing of contact 417 shunts the keyboard contacts 535 thus directing the current from wire 551 through contact 417 over wire 557 then back to grounded battery 549, thereby rendering the keyboard inoperative. It is thus seen that the breaking or opening of contacts 416 of either station breaks the signal line circuit.

Figure 31 illustrates schematically a motor controlling circuit with which each station is provided. Contact 497 is controlled by lever 499 and contact 498 is controlled by lever 506 in a manner as has been hereinbefore clearly set forth. Contacts 497 and 498 are connected in parallel with each other by means of wires 558 and 559 and in series with the motor by wires 561 and 562.

*Driving clutch control*

Referring to Figure 11, Sheet 5, it is noted that the driving clutch which controls the mechanical operations of the apparatus, herein disclosed, is located near the left end of shaft 76 and is mounted thereon adjacent the cam barrel 82, said cam barrel being shown in detail in Figure 20. It is also noted that the driving clutch member 94 is fixed, in any suitable manner, for rotation with shaft 76. The driven clutch member 565 is slidably mounted on shaft 76 and adapted to cooperate with member 94. Member 565 is provided with a flange 566 which is in turn provided with a cam surface 567 adapted to co-act with arm 568 of clutch throw-out lever 569. Lever 569 is pivoted at 571 and 572 and is provided with an arm 573 adapted to cooperate with cam 83' of cam barrel 82 to effect the release of clutch member 565, which when thus released will move into mesh or engagement with member 94 due to the action of spring 574.

We have noted from Figures 20 and 28 and the foregoing description how cams 83 function to effect the selection of selector vanes 36 to 40. A cam 83' is also provided to co-act with clutch throw-out lever 569 and is so timed that after vanes 36 to 40 have been selectively arranged, as previously described, lever 569 will be cammed out of engagement with clutch member 565 to permit said member 565 to mesh with driving member 94 to initiate the rotation of the printing and function cams splined thereto.

*Transmitter mechanism*

Although various forms of transmitter mechanisms may be used, we have chosen to illustrate in the present embodiment the transmitter mechanism disclosed in the previously mentioned U. S. Patent #1,595,472, which consists substantially as follows: Referring to Figure 11, it is noted that there is fixed on shaft 76 a gear 575 adapted to mesh with a gear 576 fixed to the transmitter shaft 577, which is suitably journaled at 578 and 579. Shaft 577 is provided with a clutch mechanism (not shown) similar in construction to that comprising members 94 and 565, hereinbefore mentioned, and adapted to be controlled by a universal bar member as set forth in Patent #1,595,472. Mounted on shaft 577 at its forward end are a series of cams, one cam 580 of which controls the locking loop 581. Cams 582 control through levers 583 (Figure 1) the making and breaking of contacts 530 and 535 (Figures 1 and 3). Locking latches 584, Figure 1, are adapted to be reciprocated to either of two positions by their associated notched selector bars (not shown) located in the keyboard. As fully set forth in the above mentioned patent the operation of the transmitting mechanism consists substantially in the depression of a key lever 585 (Figure 1) which effects the arrangement of the set of selector bars in accordance with a predetermined code combination. The setting of the selector bars determines the position of their associated locking latches 584. The rotation of the cams 580 and 582 is initiated simultaneously with the setting of the locking latches, and locking loop 581 controlled by cam 580 is permitted to rotate in a counterclockwise sense to effect the locking of latches 584. Latches 584 are provided with pointed heads 586 which when locked in place are adapted to be disposed on one side or the other of the locking loop in accordance with the setting of the selector bars. The setting of the locking latches determines whether the contact levers 583 shall or shall not be affected by their associated cams 582 to effect the closing or opening of their associated contacts 535.

Obviously, changes may be made in the details set forth without departure from the essentials of the invention as defined in the following claims.

We claim:

1. In a recorder, a stationary paper carrier, a type carriage movable to form character spaces, permutation code mechanism mounted on said carriage including longitudinally adjustable code members, and means to operate said code mechanism permutably according to the record to be made.

2. In a recorder, a type carriage movable to form character spaces, means to perform functions other than recording, a permutation device movable with said carriage to determine the character to be recorded including longitudinally adjustable members operative in varying combinations, and a stationary permutation device to control said means.

3. In a recorder, a stationary supporting frame work, a type carriage movable with respect to said stationary frame work, a printing bail in said stationary part, and slidable connecting means between said carriage and said bail to effect recording operations.

4. In a recorder, a stationary supporting frame work, a type carriage movable with relation to said frame work to form character spaces, an intermittently operable member mounted on said carriage and adapted to perform the recording operations, a printing bail mounted on said stationary frame work, and an operating connection between said member and said bail.

5. In a recorder, a movable type carriage, a ribbon carrying means mounted on said carriage, an intermittently operable member mounted on said carriage and adapted to perform the recording operations, and means cooperating with said member to effect oscillation of said ribbon to provide visibility of the record as it is made.

6. In a recorder, a traveling type carriage comprising a series of pivoted type bars, a corresponding series of actuating bars connected directly to said type bars, each adapted to operate a corresponding type bar, a set of permutation bars controlling said actuating bars; a striker bar, a set of rockable selector vanes operably connected to said permutation bars, and a selector mechanism operable to selectively effect the movement of said vanes to thereby shift the said permutation bars to either one of two positions, said permutation and striker bars cooperating directly with said actuating bars to control and effect the operation thereof.

7. In a recorder, a traveling type carriage comprising a series of pivoted type bars, a corresponding series of selectable actuating bars connected directly to said type bars and each adapted to operate a corresponding type bar, a set of permutation bars controlling said actuating bars; a striker bar controlling said actuating bars, a set of selector vanes controlling said permutation bars, a set of selectable function bars controlled by said selector vanes, and a selector mechanism selectively controlling said vanes to select said function levers and/or to actuate said permutation bars in varying combinations to selectively control said actuating bars.

8. The combination as set forth in claim 7 in which said selector mechanism comprises a single magnet responsive to receive combinations of signalling conditions, and solely mechanical connections controlled by said magnet controlling said vanes.

9. The combination as set forth in claim 7 in which said permutation bars are segmental in shape, and said actuating bars are arranged in a segmental series.

10. In a recorder, a traveling type carriage carrying a plurality of permutation code bars, a stationary frame work, a set of rockable selector vanes mounted on said stationary frame work and extending substantially parallel to the direction of movement of said carriage, and a plurality of transfer levers mounted on said carriage, and operatively connected to permutation bars and said vanes at all points in the path of travel of said carriage.

11. In a recorder, a movable type carriage carrying permutation code mechanism, a stationary frame work, bell cranks associated therewith to effect the selective movement of said code mechanism, and mounted in said carriage, a set of rockable selector vanes mounted on said stationary frame work and extending in the direction of movement of said carriage, and slidable connections between said bell cranks and said vanes operative to effect the transfer of the selective movements of said vanes to said code mechanism at any point in the path of travel of said carriage.

12. In a selecting mechanism, a plurality of selectable members, means responsive to received combinations of selecting conditions controlling said members, selectable elements controlled by said members, an additional selectable member selectively controlled by said first mentioned selectable members, and an additional selectable element selectively controlled by the setting of said first and last mentioned selectable members.

13. The combination as set forth in claim 12 in which said means comprises a single magnet selector mechanism.

14. In a selecting mechanism, a plurality of selectable elements, a plurality of permutation members controlling said elements, a plurality of selectable members responsive to received combinations of selecting conditions controlling said permutation members, an additional selectable member controlled by said selectable members, and an additional selectable element selectively controlled by the setting of said selectable members.

15. In a telegraph receiver, a plurality of type bars; a plurality of actuating bars for said type bars, a plurality of permutation members controlling said actuating bars, a plurality of selectable members responsive to received combinations of impulses controlling said permutation members, an additional selectable member controlled by said first mentioned selectable members, and mechanism selectively controlled by the setting of said selectable members.

16. In a telegraph receiver, a plurality of pivoted type bars; a plurality of actuating bars for said bars, a set of notched permutation bars controlling said actuating bars, a striker bar for operating said actuating bars, selectable members controlling said permutation bars, a selector mechanism responsive to received code combinations of impulses controlling said selectable members, an additional selectable member controlled by and cooperating with said first mentioned selectable members, and means controlled by the joint action of all of said selectable members.

17. In a telegraph receiver, a type carrying mechanism, printing mechanism cooperating with said type carrying mechanism, selectable members controlling said printing mechanism, selector mechanism responsive to received code combinations of impulses controlling said selectable members, an additional selectable member controlled by and cooperating with said first mentioned selectable members, and control means for said printing mechanism controlled by the joint action of said selectable members.

18. In a telegraph receiver, a stationary frame work, a travelling type carriage comprising a plurality of pivoted type bars, a plurality of actuating bars for said bars mounted on said carriage, a set of notched permutation bars controlling said actuating bars mounted on said carriage, a striker bar operating said actuating bars, selectable members mounted on said stationary frame work controlling said permutation bars, a selector mechanism mounted on said framework responsive to received code combinations of impulses and controlling said selectable members and an additional selectable member controlled by and cooperating with said first mentioned selectable members to increase the scope of selective operations of the receiver.

19. In a recorder, a paper carrier, type carrying mechanism, mechanism to cause printing impacts of said type carrying mechanism, shift mechanism to cause relative displacement between said type carrying mechanism and said paper carrier, selecting mechanism including a plurality of selector bars adapted to be selectively positioned in response to combinations of received selecting conditions, and an additional selector bar operated by said shift mechanism and co-operating with said first mentioned selector bars to control recording operations.

20. In a selective recorder, a record sheet, mechanism for printing on said record sheet, shift mechanism controlling printing operations on said sheet, and a selector mechanism under the control of said shift mechanism controlling recording operations.

21. In a recorder, a plurality of type bars, a plurality of selectable actuating bars controlling said type bars, a selector mechanism selectively controlling said actuating bars, an intermittently operable member adapted to effect the operation of selected ones of said actuating bars, and adjustable means adapted to control the period of engagement of said member with actuating bars to vary the force of the printing blow of the type bars.

22. In a selective recorder, a plurality of type bars, means adapted to effect the recording operation of a selected type bar, and means to disconnect said first mentioned means from the selected type bars prior to printing impact thereof.

23. The invention as defined in claim 22 wherein said last mentioned means is adjustable to vary the force of the printing impact of selected type bars.

24. In a telegraphic receiver, a plurality of type bars, a plurality of actuating bars controlling said type bars, a plurality of permutation bars selectively controlling said actuating bars, a common striker bar for effecting printing movements of said actuating bars; and a normally stationary stripper bar operative to vary the force of the printing blow of actuated type bars to effect the printing of a variant number of copies.

25. In a recorder, a stationary paper carrier, a type carriage movable to form character spaces, a plurality of type bars on said carriage, an intermittently operable member adapted to effect the recording operation of selected type bars, and means to disconnect said member from the selected type bar prior to the printing impact thereof.

26. In a recorder, a stationary framework, a paper carrier on said framework, a type carriage movable on said framework to form character spaces; a plurality of type bars on said carriage, an intermittently operable member mounted on said carriage to effect the recording operation of selected type bars, and means on the stationary part of the recorder to disconnect said member from the selected type bars prior to the printing impact thereof.

27. In a telegraph printer, printing mechanism, spacing mechanism therefor, and means cooperating with said spacing mechanism for automatically rendering said spacing mechanism ineffective in response to spacing signals under predetermined conditions.

28. In a telegraph printer, a carriage, printing mechanism co-operating therewith, means for successively advancing said carriage for spacing, and means for simultaneously automatically rendering said spacing means ineffective and arresting the printing operation when said carriage has reached a predetermined position.

29. In a telegraph printer, a traveling type carriage, printing mechanism co-operating therewith, means for effecting the spacing movement of said carriage, and further means for automatically rendering the spacing means ineffective and the printing mechanism ineffective simultaneously therewith after said carriage has reached a predetermined position.

30. In a telegraph page printer, a type carriage, printing means co-operating with said type carriage, means for effecting spacing, and means for automatically rendering the spacing means ineffective and the printing mechanism ineffective simultaneously therewith after a predetermined length of line has been printed.

31. In a recorder, printing mechanism, spacing mechanism, control mechanisms for said printing and spacing mechanisms, control elements individual to said control mechanisms, and means associated with said printing mechanism for automatically causing the release of a control element to render the printing and spacing mechanism ineffective when said printing mechanism has reached a predetermined position.

32. In a telegraph printer, a movable carriage, a main operating shaft, a spacing mechanism for said carriage comprising a multiple toothed disc driven by said shaft, a detent adapted to engage the teeth of said disc but normally held out of engagement therewith, and means actuated by said carriage in a predetermined position thereof to cause engagement of said detent with a tooth of said disc to arrest operation of said spacing mechanism.

33. In a recorder, a stationary framework, a type carriage movable to form character spaces, a permutation device movable with said carriage to determine the character to be recorded comprising a plurality of bars longitudinally adjustable in varying combinations, a permutation device supported by said stationary framework comprising a plurality of selector vanes controlling said first mentioned permutation device, and means to perform functions other than recording including a plurality of function code bars adapted to be controlled directly by said vanes.

34. In a recorder, a stationary framework, a type carriage movable to form character spaces, means to perform functions other than recording, a permutation device movable with the carriage and capable of being set in various positions to determine the character to be recorded, a permutation device in said stationary framework to control said first mentioned means, and a movable printing bail coacting with said second mentioned device to restore said first mentioned means after their operation.

35. In a recorder, a stationary paper carrier, a type carriage movable to form letter spaces, said carriage also carrying permutation code mechanism, a selecting mechanism controlling said permutation mechanism, and an integral selector vane assembly detachably interposed between said permutation code mechanism and said selecting mechanism to transfer the received selection from said selecting mechanism to said permutation code mechanism.

36. In a telegraph machine, a base portion, a signal receiving portion detachably mounted on said base portion, a transmitting portion removably attached to said base portion, and signal controlled means in said receiving portion detachably connected to means in said base portion to render said transmitting portion inoperative.

37. In a sending-receiving telegraph machine comprising a combination of a plurality of transmitting and receiving sub-combinations of mechanisms removable and replaceable as units, and selective means detachably associated with a plurality of said units controlling the functioning of said units for transmission or reception.

38. In a recorder, a paper platen, a plurality of type bars cooperating therewith, said carriage and platen being relatively movable to form character spaces, a permutation mechanism comprising a plurality of movable selector members to select the type bar to be operated, printing means for the selected type bars, and means to lock said selector members in position during printing operation comprising a notched member normally biased into engagement with said selector members and normally held out of engagement with said selector members by said printing means.

39. In a selecting mechanism, a plurality of selector members movable to a plurality of positions, a plurality of elements selectable in accordance with the positions of said selector members; means for moving said selecting members, and means operative following each selection for locking said selecting members in one selected position while said operating means tends to move said members to their next selected position, whereby a new selection may be received while the preceding selected operation is being completed.

40. In a selecting mechanism, a plurality of selector members movable to a plurality of positions, a plurality of elements selectively controlled in accordance with the positions of said selector members, operating means for said selector members including a flexible connection, and means operative following each selection for locking said selector members in one selected position while said operating means tends to move them to their next selected position, whereby a new selection may be received while the preceding selection is being completed.

41. In a selecting mechanism, a plurality of rockable selector bars, a locking means operative following each selection and associated therewith to hold said bars in their current selected position contemporaneously with the setting up of a succeeding selection.

42. In a recorder, a stationary framework, a paper carrier supported thereby, a type carriage movable to form letter spaces, permutation code mechanism on said type carriage, a selecting mechanism controlled by a single magnet mounted on said stationary framework, an integral selector vane assembly detachably mounted on said stationary framework and adapted to be interposed between said permutation code mechanism and said selecting mechanism to transfer the received selection from said selecting mechanism to said permutation code mechanism, and means for locking said selector vane assembly in either of two positions while allowing said selecting mechanism to assume another position.

43. In a recorder, a stationary paper carrier, a movable type carriage, a shock absorber for said carrier, and a manual carriage return mechanism released by said shock absorber when said carriage has been returned to the beginning of a line.

44. In a recorder, a stationary paper carrier, a transversely movable type carriage, means for biasing said type carriage to one end of its travel, spacing mechanism for moving said carriage against the action of said biasing means, manually operable means for releasing said carriage from said spacing means to allow said biasing means to move the same, latch means for maintaining said manually operable means in release position thereof, and means movable with said carriage for disengaging said latch means when the carriage reaches one end of its travel under influence of the biasing means.

45. In a telegraph printer, a function bail, selectable function bars operated thereby, a bell, a striker therefor, a pair of actuating bars spring connected to each other cooperating with said striker, one of said actuating bars being conditioned to co-act with said function bail, and the other being conditioned to co-operate with one of said selectable function bars, whereby said bell may be rung when said selectable function bar is operated to signal the operator of a printer.

46. In a recorder, a stationary framework, a type carriage movable to form character spaces, an intermittently operable member mounted on said carriage and adapted to perform the recording operation, a printing bail in said stationary framework adapted to cooperate with said member, and a permutation device in said stationary framework adapted to control recorder functions, said bail and permutation device being provided with cooperating means to arrest the recording operation when functions are performed.

47. In a recorder, a carriage movable to form character spaces, a main shaft, an operating bail, a spacing mechanism associated with said shaft adapted to space said carriage a definite number of spaces during each revolution of said shaft, and an escapement mechanism associated with said spacing mechanism and said shaft controlled by said operating bail to definitely arrest said carriage after each spacing operation.

48. In a printing telegraph machine a movable carriage, means tending continually to advance said carriage, means normally preventing advance of said carriage, and means for allowing advance of said carriage one character space just subsequent to a printing operation.

49. In a printing telegraph machine a movable carriage, means tending to continually advance said carriage, stop means normally holding said carriage stationary, an intermittently operable printing member, and means controlled by said printing member for allowing the advance of said carriage one character space just subsequent to each operation of said member.

50. In a printing telegraph machine, a movable carriage, means tending to continually advance said carriage, means normally preventing advance of said carriage, an intermittently operable printing member, and means controlled by said printing member for allowing advance of said carriage one character space for each cycle of movement of said printing member.

51. In a printing telegraph, a movable carriage, a constantly driven member, means engaged by said driven member tending to continually advance said carriage, stop means normally preventing advance of said carriage, an intermittently operable printing member, and means controlled by said printing member for releasing said stop means to allow advance of said carriage one character space during each cycle of movement of said member.

52. The invention as defined in claim 51 wherein the means controlled by the printing member includes an escapement mechanism.

53. In a printing telegraph machine a movable carriage, a constantly driven shaft, means connected to said carriage to advance the same, a friction clutch between said shaft and said means normally in engagement, stop means to engage said carriage advance means and prevent movement thereof by said driven shaft, an intermittently operable printing member; and means operated by said printing member for releasing said stop means during each cycle of movement of said member.

54. The invention as defined in claim 53 wherein the stop means comprises an escapement mechanism to allow advance of the carriage one character space for each cycle of movement of the printing member.

55. In a printing telegraph machine, a movable carriage, means normally biasing said carriage to one end of its path of travel, spacing drive mechanism tending to constantly advance said carriage against the force of said biasing means, two friction clutches in said drive mechanism, means to release one of said clutches to free the carriage from said drive mechanism to allow the biasing means to return the same to initial position, and stop means intermittently engaging said drive mechanism and causing said other friction clutch to slip when engaged.

56. In a printing telegraph machine, a movable carriage, a constantly driven member, spacing means connected to said carriage to advance the same, a friction clutch between said spacing means and said driven member, a printing member, means operable by said printing member for engaging said spacing means to allow a definite advance of said carriage for each cycle of movement of said printing member, and further means operable by movement of said carriage engageable with said spacing means to prevent advance of said carriage when the same has reached predetermined position.

57. In a recorder, a recording member movable to form character spaces, means to perform functions other than recording, a permutation device movable with said recording member to selectably control said member comprising a plurality of reciprocatory bars arranged on the arc of a circle, and a second permutation device mounted to selectably control recorder function operations.

58. In a printing telegraph receiver, a stationary paper platen, a plurality of normally substantially horizontal type bars, and selector mechanism capable of being set in varying combinations and movable with respect to said platen to effect character spacing and operable to select said type bars.

59. In a printing telegraph receiver, a stationary paper platen, a plurality of substantially horizontal type bars arranged in the form of a segment, and selector mechanism arranged in the form of a segment and movable with respect to said platen to effect character spacing and operable to select said type bars.

60. In a printing telegraph receiver, a stationary paper platen, a plurality of individual type bars movable in printing toward a common center in planes which all intersect on a common axis, and selector mechanism movable with respect to said platen to effect character spacing and operable to select said type bars, said selector mechanism including a plurality of code members segmentally arranged around said common axis.

61. In a printing mechanism, a single magnet responsive to received code combinations of impulse conditions, a stationary paper platen, a plurality of selectors variably operated by said magnet in accordance with the received code combinations, a carriage movable with respect to said platen for carrying a plurality of type bars, and means controlled by said selectors for selecting a type bar for printing each character, said means comprising a plurality of longitudinally reciprocatory code bars.

62. In a printing telegraph instrument, a single magnet responsive to received code combinations of impulse conditions, a plurality of type bars, a plurality of selecting members controlled by said magnet for selectively operating said type bars, guiding and supporting means, a carriage mounted for reciprocation on said guiding and supporting means, said type bars and selecting members being mounted on said carriage, a rack mounted on said carriage, and a driven spacing worm engaged with said rack for character spacing of said carriage.

63. In a recorder, a traveling printing element, a plurality of permutation code bars movable therewith, means responsive to signal impulses for setting said code bars in varying combinations dependent upon the character of the impulse irrespective of the position of said traveling printing element, and means forming a part of said printing element and selected for recording operation by said permutation code bars.

64. In a selective recorder, a plurality of type bars, means adapted to effect the recording operation of a selected type bar, and cam means effective during the movement of the type bar for disconnecting the first mentioned means from the selected type bar prior to the printing impact thereof.

65. In a telegraph printer, printing mechanism, a paper platen, spacing mechanism for effecting a relative movement between the printing mechanism and the paper platen, and means effective when said printing mechanism and said paper platen are in a predetermined position with respect to each other for rendering the spacing mechanism ineffective.

66. In a printing telegraph machine, a movable carriage, a constantly driven shaft, means connected to said carriage to advance the same, mechanism between said shaft and said means normally in engagement, stop means to engage said carriage advancing means and prevent movement thereof by said driven shaft, an intermittently operable printing member, and means operated by said printing member for releasing said stop means during each cycle of movement of said member.

67. In a telegraph recorder, a plurality of selectable elements, means responsive to line current impulses for controlling the positioning of said selectable elements, and an additional element associated with said other elements and positioned when the other elements are set in a predetermined position for increasing the number of possible different selecting conditions.

68. In a telegraph recorder, a plurality of selectable elements, means responsive to line current impulses for controlling the positioning of said selectable elements, shift mechanism controlled by said selectable elements, and an additional element associated with said other elements and positioned when said shift mechanism is operated and cooperating with said other elements for increasing the number of possible different selecting conditions.

69. In a recorder, a traveling type carriage carrying a plurality of permutation code bars, a set of rockable selector vanes mounted only for oscillatory movement and extending substantially parallel to the direction of movement of said carriage, and means operatively connected to the permutation bars and said vanes at all points in the path of travel of said carriage for transferring operative selection from said vanes to said code bars.

70. In a recorder, a framework, a paper carrier supported thereby, a travelling type-carrier adapted to cooperate with said paper carrier, selector mechanism appurtenant to said type-carrier and said framework, and means to render said selector mechanism divisible whereby said type-carrier is adapted to be readily detachable from said framework.

71. In a telegraph receiver, a plurality of pivoted type bars, a plurality of actuating bars for said bars, a set of notched permutation bars controlling said actuating bars, a striker bar for operating said actuating bars, selectable members controlling said permutation bars, a selector mechanism comprising a single magnet responsive to received code combinations of impulses controlling said selectable members, an additional selectable member controlled by and cooperating with said first mentioned selectable members, and means controlled by the joint action of all of said selectable members.

72. In a recorder, a stationary framework, a type-carriage movable to form character spaces, means to perform functions other than recording, a permutation device movable with the carriage and capable of being operated permutably in accordance with the character to be recorded, a permutation device in said stationary framework to control said first mentioned means, a movable printing bail, said first mentioned means comprising a plurality of notched members bifurcated to coact with said printing bail to effect the restoration of said bars after their operation.

73. In a telegraph printer, a type carriage movable to form character spaces, means comprising a multiple toothed disc, the number of teeth being equal to the number of spacing operations per revolution of said disc, to effect said spacing movement, a bail movable in a complete cycle for each character spacing operation, and detent means mounted in said bail whereby the movement of said bail during each spacing operation causes the escapement of said disc to effectuate the spacing movement of said carriage.

74. In a telegraph recorder, a plurality of selectable elements, means comprising a single magnet responsive to line current impulses for controlling the positioning of said selectable elements, and an additional element associated with said other elements and positioned when the other elements are set in a predetermined position for increasing the number of possible different selecting conditions.

75. In a recorder, a stationary supporting framework, a type carriage movable with respect to said stationary framework to form character spaces, a printing bail in said stationary part movable in a complete cycle for each character spacing operation, slidable connecting means between said carriage and said bail, a main operating shaft, spacing means mounted on said shaft comprising a ratchet having teeth equivalent in number to the number of spacing operations per revolution of said shaft to effect said spacing movement, and detent means stationarily mounted in said printing bail whereby the movement of said bail during each spacing operation permits the escapement of said spacing means to effect the movement of said carriage with respect to the stationary part for recording operations.

76. In a recorder, a stationary supporting framework, a type carriage movable with relation to said framework to form character spaces, an intermittently operable member mounted on said carriage and adapted to perform the recording operations, a printing bail mounted on said stationary framework movable in a complete cycle for each character spacing and recording operation, slidable connecting means between said carriage and said bail, a main operating shaft, means mounted on said shaft comprising a spacing ratchet having teeth equivalent in number to the number of spacing operations per revolution of said shaft to effect said spacing movement, and detent means stationarily mounted in said printing bail adapted to cooperate with said ratchet whereby each cyclic movement of said bail effectuates simultaneously the spacing and recording operations.

77. In a recorder, a stationary supporting framework, a type carriage movable with relation to said framework to form character spaces, an intermittently operable member mounted on said carriage and adapted to perform the recording operations, a printing bail mounted on said stationary framework movable in a complete cycle for each character spacing and recording operation, slidable connecting means between said carriage and said bail, a main operating shaft, means mounted on said shaft comprising a spacing ratchet having teeth equivalent in number to the number of spacing operations per revolution of said shaft to effect said spacing movement, detent means stationarily mounted in said printing bail adapted to cooperate with said ratchet whereby each cyclic movement of said bail effectuates substantially simultaneously the spacing and recording operations, means mounted in said stationary part to perform operations other than recording, and means to render said printing bail inoperative when said last mentioned operations are performed.

78. In a recorder, a printing bail, a plurality of selectable elements, means responsive to line current impulses for controlling the positionment of said selectable elements, a plurality of functional elements selectively controlled by said selectable elements, said functional elements provided with means cooperating with said printing bail to control the co-action of said functional elements with said selectable elements.

79. In a recorder, a movable type carriage, a ribbon carrying means mounted on said carriage, an intermittently operable member mounted on said carriage and adapted to perform the recording operations, a shiftable platen, means to render said first mentioned means shiftable with said platen to maintain its cooperative relation therewith, and means cooperating with said member to effect oscillation of said ribbon to provide visibility of the record as it is made in either the shift or unshift positions of said platen.

80. In a recorder, a movable type carriage, mechanism in said carriage for effecting recording operations, a platen, shift mechanism for controlling said platen, ribbon carrying mechanism mounted on said carriage, and intermittently operable means mounted on said carriage and adapted to perform recording operations, and means cooperating simultaneously with said member and said platen to effect oscillation of said ribbon irrespective of the position of said platen to provide visibility of the record as it is made.

81. In a selective recorder, a stationary paper carrier, a transversely movable type carriage, means for biasing said type carriage to one end of its travel, spacing mechanism for moving said carriage against the action of said biasing means, dually operated means for releasing said carriage from said spacing means to allow said biasing means to move said carriage comprising a manually operable component and a selectively operable component, latch means associated with said components for maintaining said dually operated means in release position thereof, to insure the complete return of said carriage, and means to automatically detach said latch means from said dually operated means.

In testimony whereof we affix our signatures.

STERLING MORTON.
HOWARD L. KRUM.
EDWARD E. KLEINSCHMIDT.